United States Patent
Al-Madhoun

(10) Patent No.: US 10,704,791 B2
(45) Date of Patent: Jul. 7, 2020

(54) CLIMATE CONTROL SYSTEMS USING POZZOLAN MATERIALS

(71) Applicant: KING ABDULLAH UNIVERSITY OF SCIENCE AND TECHNOLOGY, Thuwal (SA)

(72) Inventor: Nassar Mahmoud Al-Madhoun, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 57 days.

(21) Appl. No.: 15/501,596

(22) PCT Filed: Aug. 4, 2015

(86) PCT No.: PCT/IB2015/001639
§ 371 (c)(1),
(2) Date: Feb. 3, 2017

(87) PCT Pub. No.: WO2016/024163
PCT Pub. Date: Feb. 18, 2016

(65) Prior Publication Data
US 2017/0234554 A1    Aug. 17, 2017

Related U.S. Application Data

(60) Provisional application No. 62/032,711, filed on Aug. 4, 2014.

(51) Int. Cl.
*F24F 3/14* (2006.01)
*F24F 6/04* (2006.01)
*F24F 5/00* (2006.01)

(52) U.S. Cl.
CPC .............. *F24F 3/14* (2013.01); *F24F 3/1417* (2013.01); *F24F 5/0035* (2013.01); *F24F 6/04* (2013.01)

(58) Field of Classification Search
CPC .... F24F 3/14; F24F 5/0035; F24F 6/04; F24F 3/1417; C04B 28/04; C04B 28/021; C04B 28/18; C04B 18/08; B01D 53/263
See application file for complete search history.

(56) References Cited

U.S. PATENT DOCUMENTS 4,256,500 A * 3/1981 Turpin, Jr. .............. C04B 24/06
                                                        106/679
4,259,401 A    3/1981 Chahroudi
(Continued)

FOREIGN PATENT DOCUMENTS

FR    935 697 A    6/1948
FR    1 147 067 A    11/1957
(Continued)

OTHER PUBLICATIONS

International Search Report and Written Opinion of Application No. PCT/IB2015/001639 dated Dec. 14, 2015, 11 pages.

*Primary Examiner* — Emmanuel E Duke
(74) *Attorney, Agent, or Firm* — Patent Portfolio Builders PLLC

(57) ABSTRACT

A system and method for conditioning air is provided that optimizes the use of sustainable and locally sourced materials with agrarian, residential, and industrial applications. The system can be formed with a porous siliceous, or siliceous and aluminous material that is sufficiently porous, to allow conditioning fluid to flow there through. The material can also be formed into a structure that includes one or more passageways configured to allow air to be conditioned to also pass there through. The structure can be configured to cause the conditioning fluid passing through the porous portions of the structure to intersect and mix with air passing there through. The structure may include a plurality of passageways and intersections and may include a plurality of air inlets and outlets for air passage. The (Continued)

system may additionally include a means for storing, collecting, and driving conditioning fluid through the system and a means for collecting solar radiation to drive airflow and regenerate conditioning fluid.

18 Claims, 24 Drawing Sheets

(56) References Cited

U.S. PATENT DOCUMENTS

| | | | | |
|---|---|---|---|---|
| 4,313,763 | A * | 2/1982 | Turpin, Jr. | C04B 24/06 |
| | | | | 106/679 |
| 2006/0032807 | A1* | 2/2006 | Sansalone | B01D 15/00 |
| | | | | 210/263 |
| 2008/0179253 | A1* | 7/2008 | Clark | B01J 20/06 |
| | | | | 210/660 |
| 2010/0089293 | A1* | 4/2010 | Guynn | C04B 28/02 |
| | | | | 106/709 |
| 2013/0055736 | A1 | 3/2013 | Everett | |
| 2014/0196901 | A1* | 7/2014 | Patil | C09K 8/467 |
| | | | | 166/292 |
| 2014/0332216 | A1* | 11/2014 | Ravi | C04B 28/04 |
| | | | | 166/293 |

FOREIGN PATENT DOCUMENTS

| | | | | |
|---|---|---|---|---|
| KR | 20140018598 A * | 2/2014 | | Y02A 40/27 |
| WO | 2008039779 A2 | 4/2008 | | |

* cited by examiner

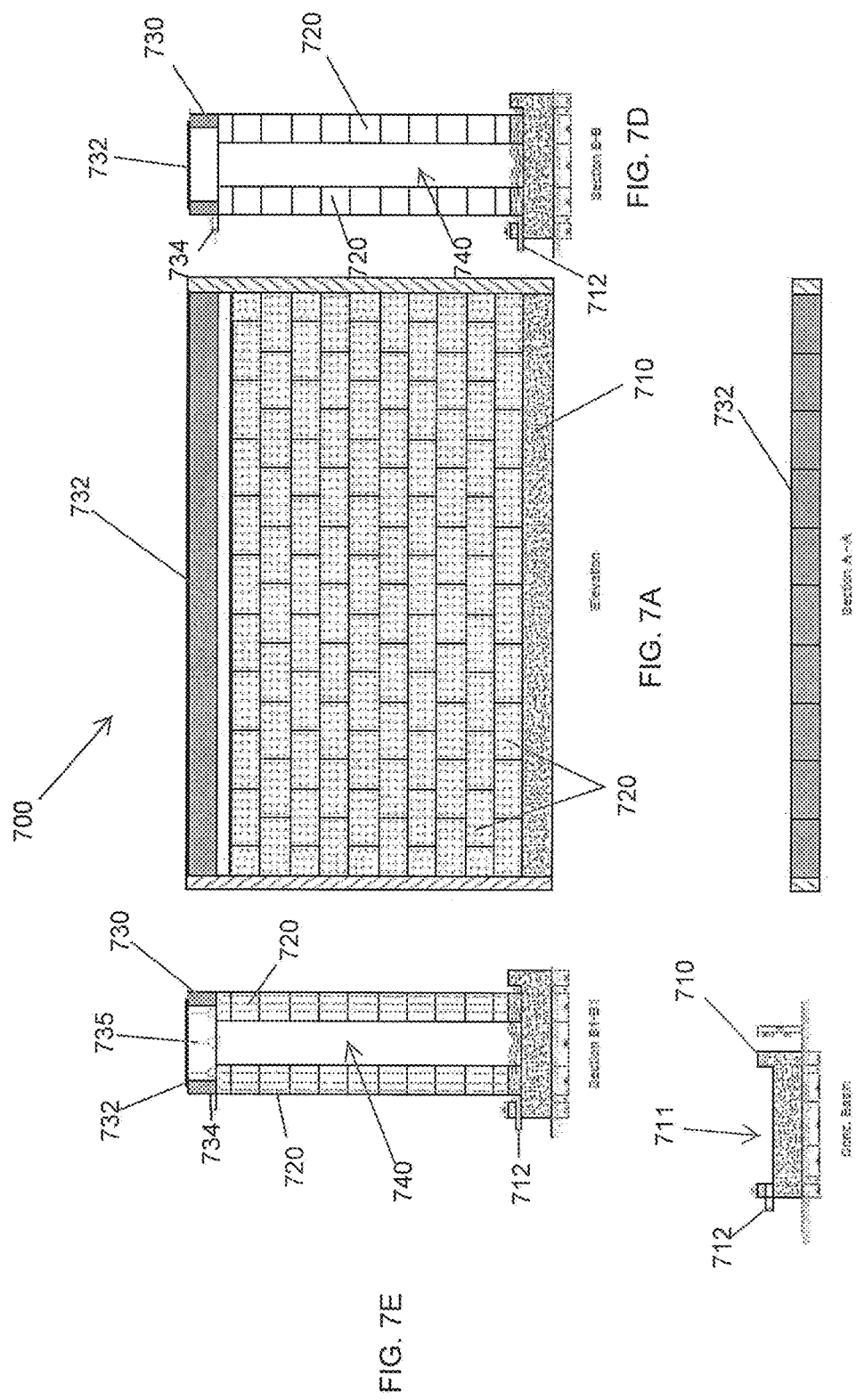

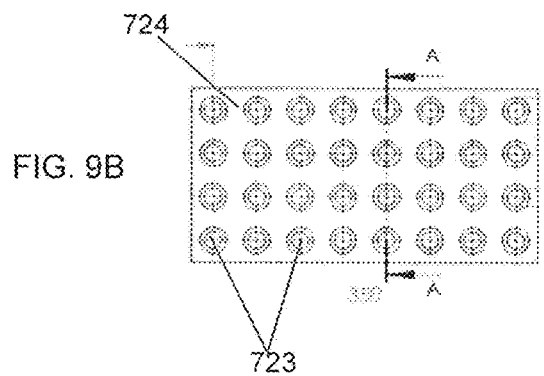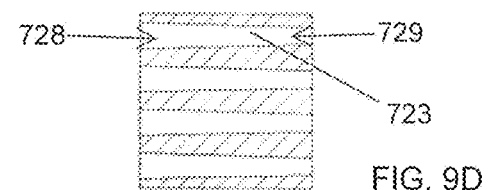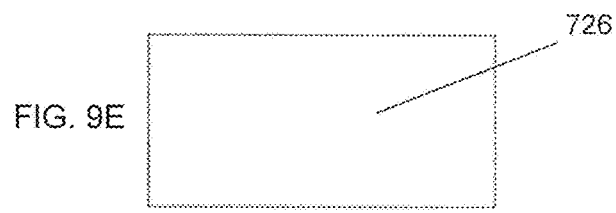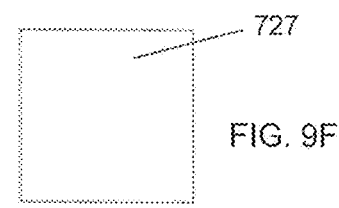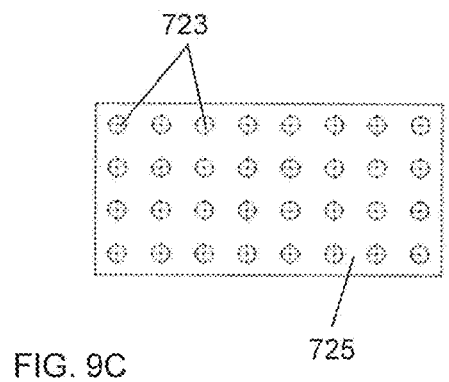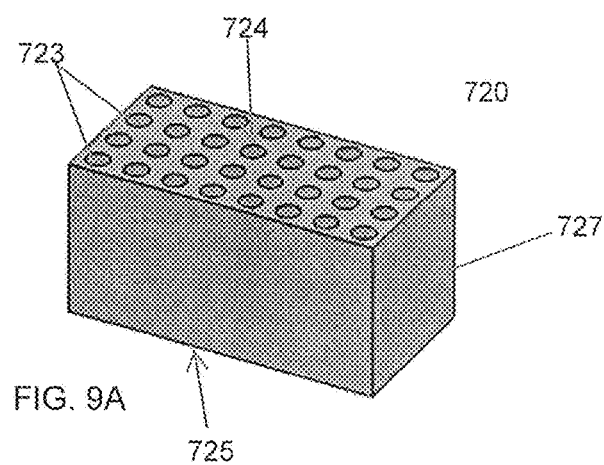

CLIMATE CONTROL SYSTEMS USING POZZOLAN MATERIALS

CROSS-REFERENCE TO RELATED APPLICATION

This application is the National Stage of International Application No. PCT/IB2015/001639, filed 4 Aug. 2015, which claims the benefit of and priority to U.S. Provisional Application Ser. No. 62/032,711, having the title "USE OF POZZOLAN MATERIALS AS COOLING SYSTEMS," filed on 4 Aug. 2014, the entire disclosures of which are incorporated by reference in their entireties as if fully set forth herein.

TECHNICAL FIELD

The present disclosure generally relates to climate control systems for buildings in desertic/coastal areas and in particular to systems for controlling the cooling, heating, humidification and dehumidification of air within a structure such as a building including for example, agricultural buildings or greenhouses in such areas.

BACKGROUND

Agricultural building challenges in desertic/dry climatic conditions are mainly climate control and water consumption.

The most commonly used solutions to face hot climatic conditions are the evaporative cooling systems employing cellulose pads. The advantages on other systems are the low costs and a reduced demand in water and energy consumption. Despite advantages on other alternatives, the major drawbacks of evaporative cooling systems are their limitations in humid climate due to lack of evaporation.

The use of cellulose pads generally requires good water quality which is a scarce resource in desertic climates. They also suffer from high maintenance dependence to prevent clogging in cellulose pads and an average lifetime of 2 years.

Conventional cooling systems have, thus, suffered low longevity, low reliability and high maintenance. Similar issues apply to use of cellulose pads for heating and/or humidifying air. Climate control requirements are not limited to agricultural buildings, but may apply to any structure or buildings requiring climate control of air therein.

Accordingly, there is a need to address the aforementioned deficiencies and inadequacies. For example, there is a need for sustainable material and resources for use in climate control systems for the conditioning of air within structures or buildings in desertic/coastal areas.

SUMMARY

The present disclosure provides a solution to optimize the use of sustainable materials for use in climate control systems for the conditioning of air. It includes robust technology design and resources available in coastal and desertic areas for climate control in buildings and systems including, for example, for agricultural and greenhouse applications. It can also be used in many other applications requiring climate control, such as residential and industrial applications.

The present disclosure uses natural resources available in most arid desert areas, particularly coastal areas to provide a climate control solution. In one or more aspects, the proposed solution relies on porous materials, such as pozzolan, that are appropriate for different kind of water with varying qualities from fresh water to very saline water.

In various aspects, the present disclosure solves the problem of using saline, or sea water, and porous materials such as cellulose pads to provide a low-cost solution climate control applications. For example, it may be used in hot and humid areas where conventional evaporative processes using for example cellulose pads with fresh water will be less sustainable or will not provide the desired performance. By climate control we mean the control of a climate within a structure or building, in particular climate control systems for conditioning air within a structure or building: The conditioning of the air within the structure or building can include any one or more of cooling, heating, humidifying or dehumidifying the air therein.

The solution provided can operate in high temperature, high humidity conditions where other solutions are less sustainable or consume too much energy to operate.

In an embodiment, we provide a system for conditioning air. The system can comprise a structure formed of a porous siliceous or siliceous and aluminous material, the material being sufficiently porous to allow a liquid to pass through the material, the structure including one or more passageways configured to allow air to pass through the one or more passageways through the structure, the structure configured to cause a liquid passing through a porous portion of the material to intersect and mix with air passing through the one or more passageways. The structure can be formed as a brick, tile or block. The the material can be a pozzolan material.

In any one or more aspects, the structure can include a plurality of air passageways and the air passageways can be configured to induce turbulence in air passing through the passageways. The system can include a plurality of the structures, the system further having means to supply the liquid to the plurality of the structures and one or more basins for collecting the liquid after it has passed through the plurality of the structures. The means to supply the liquid can provide cooling water to the system and the mixing of the air and liquid in the system can create an evaporative cooling mechanism of air passing through one or more of the passageways.

In any one or more aspects, the system can include: a first structure formed of a porous siliceous or siliceous and aluminous material, the material being sufficiently porous to allow a liquid to pass through the material, the first structure including one or more passageways configured to allow air to pass through the one or more passageways through the structure, the first structure configured to cause a liquid passing through a porous portion of the material to intersect and mix with air passing through the one or more passageways the one or more passageways of the first structure having an inlet configured to receive air into the one or more passageways and an outlet configured to allow air to pass out of the one or more passageways of the first structure; and means to supply a liquid desiccant to the material in the first structure; and a second structure formed of a porous siliceous or siliceous and aluminous material, the material being sufficiently porous to allow a liquid to pass through the material, the second structure including one or more passageways configured to allow air to pass through the one or more passageways through the second structure, the second structure configured to cause a liquid passing through a porous portion of the material to intersect and mix with air passing through the one or more passageways the one or more passageways of the second structure having an inlet configured to receive air from the outlet of the one or more passageways and an outlet configured to allow air to pass out of the one or more passageways of the second structure and means to supply a cooling water to the material in the second structure.

In any one or more aspects, the liquid can be a liquid desiccant in the form of a mixed salt desiccant liquid. The liquid desiccant can be selected system from the group consisting of calcium chloride, magnesium chloride, lithium chloride or lithium bromide. The liquid can be salt water. The liquid can be sea water. The conditioning of the air can be selected from the group of de-humidifying, humidifying, cooling or heating the air.

In an embodiment we provide a method for conditioning air. The method can comprise: a) providing a system of any of claims 1-5, the one or more passageways each including an inlet and an outlet; b) providing a supply of the liquid to the porous material and causing the liquid to flow through the porous material; c) providing air to the inlet of the one or more passageways and causing the air to flow through the one or more passageways; d) causing the flow of the air to intersect with and mix with the flow of the liquid, the mixing of the air with the liquid resulting in a conditioning of the air. In any one or more aspects, the conditioning of the air can be selected from the group of de-humidifying, humidifying, cooling or heating the air. The liquid can be a liquid desiccant or a cooling water.

In any one or more aspects of the method the system can include: a first structure formed of a porous siliceous or siliceous and aluminous material, the material being sufficiently porous to allow a liquid to pass through the material, the first structure including one or more passageways configured to allow air to pass through the one or more passageways through the structure, the first structure configured to cause a liquid passing through a porous portion of the material to intersect and mix with air passing through the one or more passageways the one or more passageways of the first structure having an inlet configured to receive air into the one or more passageways and an outlet configured to allow air to pass out of the one or more passageways of the first structure; and means to supply a liquid desiccant to the material in the first structure; and a second structure formed of a porous siliceous or siliceous and aluminous material, the material being sufficiently porous to allow a liquid to pass through the material, the second structure including one or more passageways configured to allow air to pass through the one or more passageways through the second structure, the second structure configured to cause a liquid passing through a porous portion of the material to intersect and mix with air passing through the one or more passageways the one or more passageways of the second structure having an inlet configured to receive air from the outlet of the one or more passageways and an outlet configured to allow air to pass out of the one or more passageways of the second structure and means to supply a cooling water to the material in the second structure.

In any one or more aspects, the liquid can be a liquid desiccant in the form of a mixed salt desiccant liquid. The liquid desiccant can be selected system from the group consisting of calcium chloride, magnesium chloride, lithium chloride or lithium bromide. The liquid can be salt water. The liquid can be seawater.

In any one or more aspects of the method, the system can include a storage tank for storing water, in particular seawater, for delivery to the structure. The water can be either for cooling or heating air. The seawater can also be used to humidify air. A pump can be provided to deliver sea water to the storage tank or directly for delivery to the structure.

The sea water may be underground sea water in which case the system can include a well for obtaining sea water as cooling liquid for delivery to the system. The storage tank can include solar heating for heating the seawater in the case when the seawater is to be used for heating air or humidifying air or both.

In any one or more aspects, the structure can include a desiccant liquid storage tank for storing desiccant liquid for delivery to the structure and/or for receiving desiccant liquid collected from the structure and returned to the tank. The desiccant liquid tank can include means for regenerating the desiccant liquid by evaporating water collected by the desiccant liquid or driving water from the desiccant liquid that is collected as it passes through the structure. The means for re-generating the desiccant liquid can include a transparent roof section for the desiccant liquid storage tank allowing solar heat to pass through the roof section and cause of evaporation of water in the desiccant liquid.

In any one or more aspects the system can include a solar updraft tower (SUT) to provide motive force for drawing ambient air through one or more of the air conditioning structures in the system. The solar updraft tower can include roofing leading to an upright hollow tube or tower through which the air can pass. The roofing structure can include a metal roof section, which can be black, or a honeycomb observer section or a transparent sheet section or, any combination thereof for receiving solar radiation to cause a heating of air within the roofing section, the heating of the air within the roofing section causing the air to rise up and pass through the upright tube and be exhausted to the atmosphere.

One skilled in the art will recognize that the systems can be used to not only cool and/or dehumidify air, but also to heat and/or humidified the air. Accordingly, the systems and methods can be used to condition air in the form of dehumidifying, humidifying, cooling and/or heating air passed through the system.

Other systems, methods, features, and advantages of the present disclosure for use, for example, in desertic/coastal areas will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 7 depicts an exemplary pozzolan cooling wall. FIG. 7A is an elevation view of the wall. FIG. 7B is a side view of the concrete basin of the pozzolan cooling wall. FIGS. 7C-7E are sectional views showing the interior of the wall. FIG. 7F is a side view of the cover tile that covers the distribution chamber.

FIG. 9 is a diagram of a pozzolan block for the pozzolan cooling wall. FIG. 9A is a perspective view of the pozzolan brick. FIGS. 9B and 9C are surface views of the first and second surface of the pozzolan brick. FIG. 9D is a section view along A-A depicting the tapered air passage in the pozzolan brick. FIGS. 9E and 9F are surface views of the sides of the pozzolan brick.

DETAILED DESCRIPTION

Figure 1:
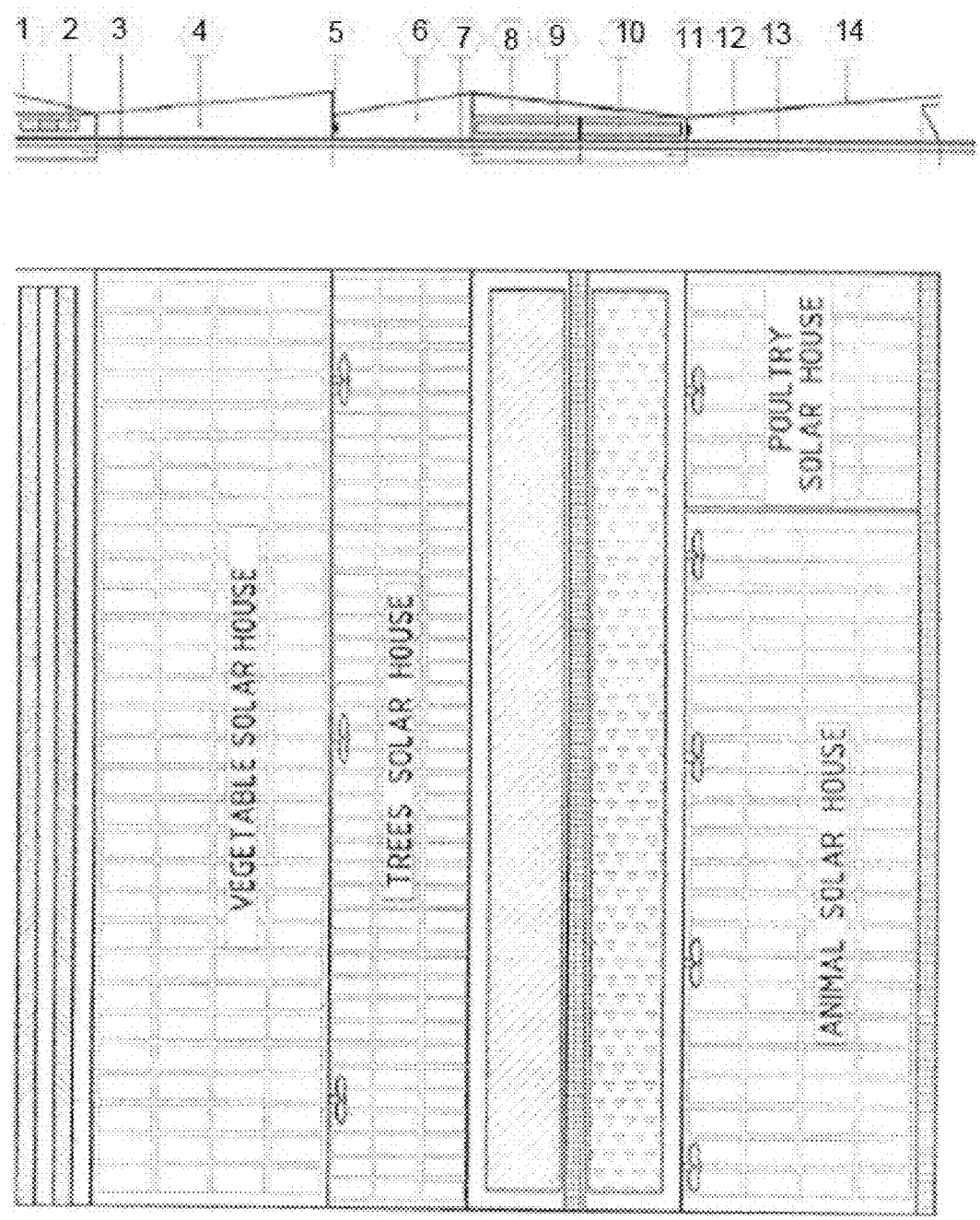
FIG. 1 depicts one example of a multi-purpose solar bio-farm, including a variety of solar bio-houses for which the present disclosure may be applied.

Described below are various embodiments of the present climate control systems and methods for conditioning air within a structure or building, in particular in desertic/coastal areas, such as in agricultural buildings, greenhouses, and any other building in a desertic climate therefor. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

Discussion

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperatures is in ° C., and pressure is in bar. Standard temperature and pressure are defined as 0° C. and 1 bar.

It is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Description

Conventional greenhouses and animal houses utilize, for example, cellulose pads for evaporating fresh water and for conditioning air, in particular for creating cooling of air in bio-farms. This has been the case in arid desertic/coastal areas for years. For example, since about 40 years the Saudi greenhouse industries have used freshwater and cellulose pads for evaporative cooling systems inside agriculture greenhouses and poultry farms. Every square meter inside a greenhouse needs a minimum of about 10 L/D of fresh water to cool the space of the greenhouse. Sometimes it needs 20 L/D. This is a very costly operation, requiring significant maintenance. These systems consume large amounts of fresh water, as much as millions of cubic meters per year, for cooling applications. Further, the cellulose pads have a short predicted life of typically less than two years, while using high quality fresh water. The greenhouse industries to produce vegetables and poultry spend 4 Billions SR/yearly. Most of the greenhouse farms in the western province of Saudi Arabia especially on the Toham coastal desert have closed, having insufficient freshwater for irrigation and cooling. Many areas in the Middle East suffer from a shortage of fresh water, having insufficient fresh water for irrigation, for cooling and for drinking.

The present disclosure eliminates use of the cellulose pads and also use of fresh water for the climate control applications, in particular for conditioning air within a structure or building. In various aspects the pads are replaced with particular types of porous bricks or blocks. In any one or more aspects the porous bricks or blocks are made of a Pozzolan material. The Pozzolan material can be collected from dead volcanic mountains and are largely available. It further allows use of any kind of water with varying qualities, from fresh water to very saline water of up to 200,000 parts per million (ppm) or more. This is in contrast to cellulose cooling pads that cannot be used with saline water having more than about 1000 ppm without clogging. One of the main advantages of Pozzolan material is a high resistance to salts especially mixed sea salt. Also it is lighter than the normal cement bricks. Also Pozzolan material is a sustainable material that is longer lasting than cellulose and requires no maintenance. It is easy to clean and can use any type of water.

A pozzolan material is a siliceous or siliceous and aluminous material which, in itself, possesses little or no cementitious value but which will, in finely divided form and in the presence of water, react chemically with calcium hydroxide at ordinary temperature to form compounds possessing cementitious properties. The broad definition of a pozzolan imparts no bearing on the origin of the material, only on its capability of reacting with calcium hydroxide and water. A quantification of this capability is comprised in the term pozzolanic activity. By pozzolan material we also include naturally-occurring pozzolans of volcanic origin.

The general definition of a pozzolan embraces a large number of materials which vary widely in terms of origin, composition and properties. Both natural and artificial (man-made) materials show pozzolanic activity and are used as supplementary cementitious materials. Artificial pozzolans can be produced deliberately, for instance by thermal activation of kaolin-clays to obtain metakaolin, or can be obtained as waste or by-products from high-temperature process such as fly ashes from coal-fired electricity production. The most commonly used pozzolans today are industrial by-products such as fly ash, silica fume from silicon smelting, highly reactive metakaolin, and burned organic matter residues rich in silica such as rice husk ash.

By "pozzolans" we also include natural pozzolanas. Natural pozzolanas are abundant in certain locations and are extensively used as an addition to Portland cement in countries such as Italy, Germany, Greece and China. Volcanic ashes and pumices largely composed of volcanic glass are commonly used, as are deposits in which the volcanic glass has been altered to zeolites by interaction with alkaline waters. Deposits of sedimentary origin are less common. Diatomaceous earths, formed by the accumulation of siliceous diatom microskeletons, are a prominent source material here.

An example of one layout, among many, of a multi-purpose bio-farm including a variety of bio-houses depicted is in FIG. 1. The bio-house may include a first roof solar still 1 and cooling rooms 2. A first cold salinity water basin 3 may be associated with the cooling rooms 2. The bio-farm may also include a vegetable solar house 4 having an air exhaust 5, for example one or more exhaust fans. The bio-farm may include a solar house 6 for trees or similar plants. A second roof solar still 8 may be included along with an associated second cold salinity basin 7, a main hot water evaporator 9 and a main condenser 10. An animal and/or poultry house 12 may also be included. Exhaust fans 11 draw cooling air from the main condenser 12 into the animal and/or poultry house 12. A main fresh water ground tank 13 may be provided for the animal and poultry house 12. A thermal exhaust path 14 may be included to draw air out of the animal and/or poultry house 12.

The present disclosure is directed to a novel system for use in climate control, such as conditioning air in buildings. By "conditioning air" we include cooling, heating, dehumidifying and/or humidifying air. In the discussion below, we focus primarily on use of our system to cool and/or dehumidify air. The system, however, can also be used to heat and/or humidify air.

In a non-limiting example, the system can be used for conditioning air in bio-houses such as that depicted in FIG. 1. In various aspects the system of the present disclosure for conditioning air in one or more bio-houses of a bio-farm can include a salinity water evaporative cooling system, a liquid desiccator system for removing humidity from ambient air, a solar re-generator system for re-generating the liquid desiccator, one or more plant and/or animal housing structures, such as a greenhouse and an animal and/or poultry house (referred to herein as "house" structures). In various aspects the "house" structures can be simple plastic tunnels or multi-span polycarbonate structures or glass houses or transparent or semi-transparent photovoltaic (PV) panels. The bio-farm may be an active farm using exhaust fans for cooling ventilation and air movement, or a passive system using a solar updraft system for providing air movement throughout. The bio-farm may also include a water pump, such as a windmill water pump, one or more basins for water storage and a solar energy system, such as a solar power station, to provide energy for running fans, lights, control systems, communications and the like.

Figure 2:
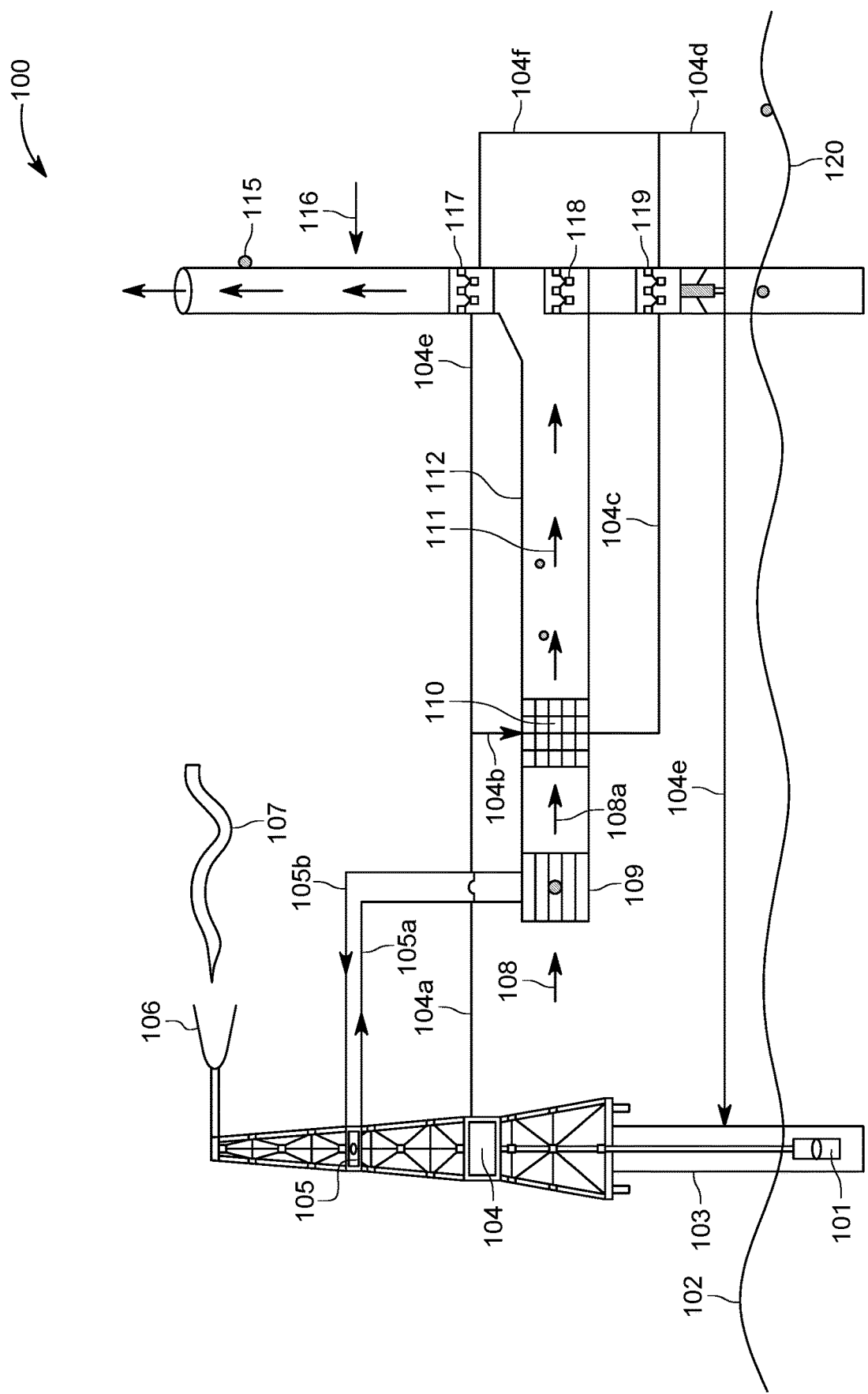
FIG. 2 depicts a non-limiting example of a solar wind bio-farm (SWBF) of the present disclosure.

Depicted in FIG. 2 is a non-limiting example of a bio-farm including an exemplary system 100 for conditioning air of the present disclosure. The bio-farm can include a pump 101 for pumping underground seawater 102 up out of the ground for use in a conditioning system for air in the farm. The pump can draw underground seawater through a well 103 into a seawater storage tank or reservoir 104. The pump may be operated by a windmill 106 driven by wind energy 107. A second tank or reservoir 105 is provided for holding a desiccant liquid for use in a desiccant system 109 for dehumidifying ambient air. Suitable liquid desiccants include a mixed-salt desiccator (bittern) of calcium chloride, or magnesium chloride or lithium chloride, lithium bromide or any other salt desiccant solution.

The farm also includes a system 110 for cooling the air in the bio-farm. The farm can include one or more houses, such as greenhouses and animal houses 112. Cool air 111 from the cooling system 110 is brought into the one or more houses for cooling the houses. Exhaust means are provided for exhausting air from the houses, thus providing air movement through the houses of the bio-farm. The exhaust means may include one or more exhaust fans and exhaust paths as, such as depicted in FIG. 1. The exhaust means may also comprise a solar updraft tower 115 such as depicted in FIGS. 2 and 3.

In operation, pump 101 draws cool or cold seawater from a high salinity water well using wind energy 107 from windmill 106. The seawater can be delivered directly to the cooling system. The seawater can also be stored in the first storage tank 104 to provide cooling water for the system and delivered out of the first storage tank 104 and provided to the cooling system 110 by paths or conduits 104a, b to create an evaporative cooling process, described in more detail below. Cooling water that passes through and out of the cooling system can be collected and ultimately returned to the first storage tank 104 via paths 104c-104e. In an aspect the collected cooling water can be returned directly to tank 104. In other aspects, it can be returned to well 103. It can also be passed through a heat exchanger 119 as depicted in FIG. 2. Cooling water can also be passed via path 104e to a heat exchanger 117 in conjunction with solar updraft tower (SUT) 115 and returned via path 104 f.

In a high-humidity weather environment warm, humid inlet air 108 can be passed through desiccant system 109 to lower its humidity by absorbing humidity into desiccant liquid provided by path 105a from the second storage tank 105 to the desiccant system 109. The desiccant system 109 increases the efficiency of the cooling system 110. Liquid desiccant from the desiccant system is returned by path 105b back to its storage tank 105. Thus, as depicted in FIG. 2, ambient warm, humid air 108 is brought into the one or more houses 112 first passing through the desiccant system 109 to lower its humidity and then through a cooling system 110 to cool the air prior to deliver cool air 111 to the one or more houses 112. The cooled air 111 can be passed through a heat exchanger 118.

Figure 3:
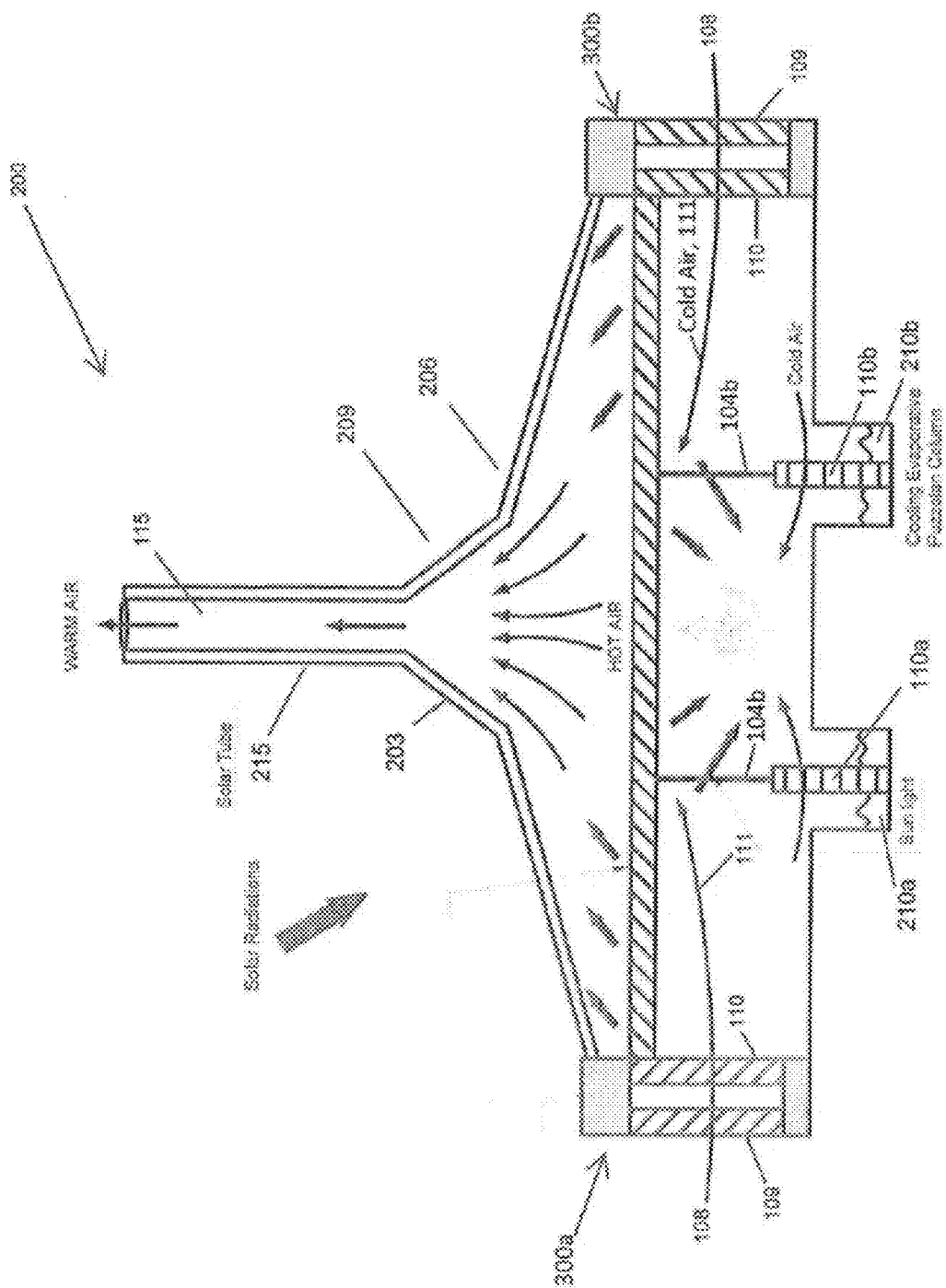
FIG. 3 depicts an example of a solar up-draft tower (SUT) for use in drawing air through a bio-farm of the present disclosure.

FIG. 3 depicts a non-limiting example of a solar updraft tower (SUT) 200 for use in the present bio-farm. The solar updraft tower draws ambient air through a desiccant system 109 and a cooling system 110 and then through one or more houses of a bio-farm. FIG. 3 depicts opposed units 300 a, b spaced on opposite sides of the tower assembly 200 that includes a desiccant system 109 and a cooling evaporative system 110 as generally described herein. It should be recognized, however, that a bio-farm of present disclosure need not include two such opposed units 300. One or more such units may be included for receiving warm, humid ambient air 108, drying (or desiccating) the warm air using the desiccant system 109 and subsequently cooling the warm air 108 for introduction into the interior of one or more houses of the bio-farm. The air after passing through unit 300 is dehumidified and cooled.

One or more additional cooling systems 110a, 110b may be provided for cooling air passing through the bio-farm after it has entered the bio-farm through one or more of the units 300. These additional cooling units have a seawater supply line 104b providing seawater from seawater storage tank 104 to the cooling system. Seawater collection basins 210a, 210b can be provided for collecting seawater that has passed through the cooling systems 110a, 110b. One or more of these cooling systems 110a, 110b can be located intermittently within the bio-farm to aid in re-conditioning (e.g., re-cooling) the air 111 that as it passes through the bio-farm will naturally heat up due to solar radiation collected within one or more houses of the bio-farm. This dehumidified, cooled air 111 can be drawn through the bio-farm system, and eventually exhausted from the bio-farm, by the solar updraft tower 115.

As depicted in FIG. 3, the solar updraft tower 115 can comprise a solar updraft tower (SUT) assembly 200 including a number of component parts besides the updraft tower 115. The solar updraft tower 115 can include a substantially vertical section in the form of tube 215. In one or more aspects tube 215 may comprise a single wall polycarbonate tubular element. One or more roofing sections may adjoin or may lead up to tube 215. For example, in one or more sections, the roofing may comprise a black solid thick metal roof section 203 that may include a black metal honeycomb absorber 203. In other aspects the roofing adjoining tube 215 may comprise a single wall polycarbonate transparent sheet 209 and/or a double wall polycarbonate transparent sheet 206. Solar radiation is received in tube 215 and by one or more of the roofing sections leading up to and/or adjoining tube 215 causing interior air in the vicinity of tube 215 to heat up, rise up and passed through tube 215 and be exhausted out of the bio-farm.

Figure 4:
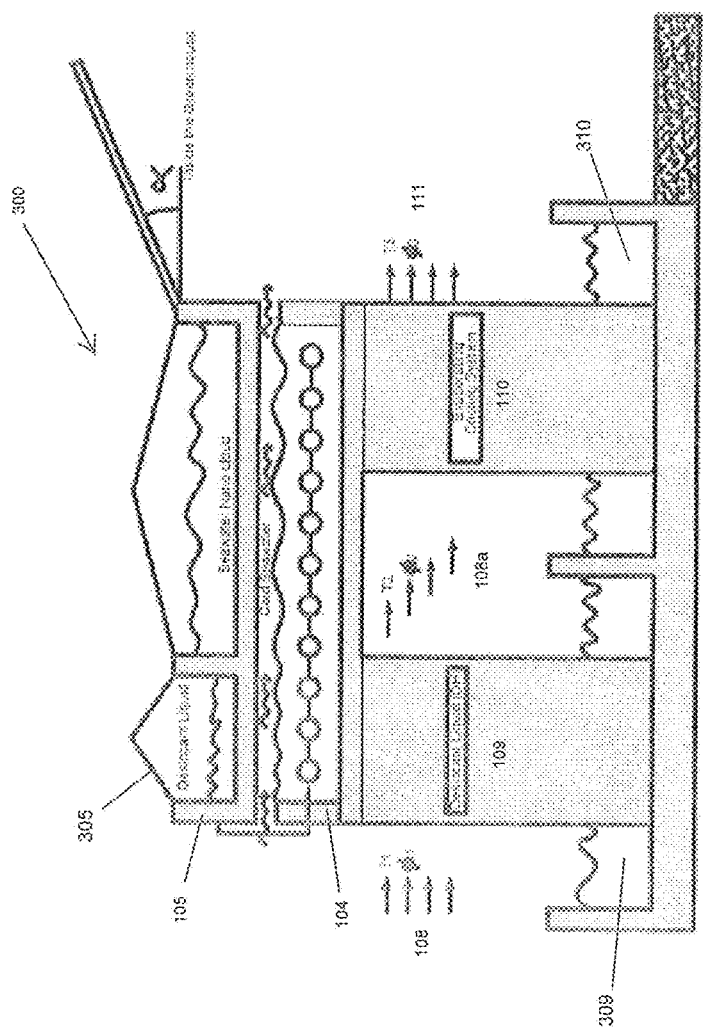
FIG. 4 depicts an example of a desiccant and a cooling system for conditioning air passing through a bio-farm of the present disclosure.

FIG. 4 depicts a non-limiting example of a unit 300 including an exemplary desiccant system 109 and an exemplary cooling evaporative system 110. The unit 300 can include a seawater tank or reservoir 104 and a desiccant liquid tank or reservoir 105. As previously mentioned the seawater tank 104 can receive seawater drawn from underground by pump 101. The desiccant liquid tank 105 can hold a desiccant liquid for use as described, for example, in relation to FIG. 2 above.

As depicted warm, humid ambient air 108 is introduced into unit 300 and passes through the desiccant system 109. The warm humid ambient air enters the unit at a first temperature, $T_1$, and a first humidity, $H_1$, and exits the desiccant system 109 at a lower temperature $T_2$, and a lower humidity $H_2$. The air 108a exiting the desiccant system 109 then passes through the evaporative cooling system 110 exiting that system having a lower temperature, $T_3$ and lower humidity, $H_3$.

Desiccant liquid is delivered from the desiccant liquid tank 105 to the desiccant system 109. The desiccant liquid passes through the desiccant liquid system 109 removing humidity from air 108. Ultimately the desiccant liquid exits system 109 and is collected in a basin or reservoir 309 ultimately for delivery back to desiccant liquid tank 105. Similarly, seawater is delivered from the seawater tank 104 to the cooling system 110. The seawater passes through the cooling system 110 and ultimately can be collected in basin or reservoir 310 for delivery back to seawater tank 104. The seawater passing through cooling system 110 serves to cool the air 108a entering the cooling system such that the air 111 exits the cooling system at a lower temperature.

Desiccant liquid tank 105 can include a transparent roof section 305 for receiving solar energy that can be used to aid in evaporating water collected by the desiccant liquid as it passes through the desiccant system 109 and dehumidifying the warm air 108 entering the desiccant system 109. This evaporation of water from the desiccant liquid aids in regenerating the desiccant liquid so that the desiccant liquid may be sent back to the desiccant system 109 to collect more water from warm air 108 entering the desiccant system 109.

Figure 5A:
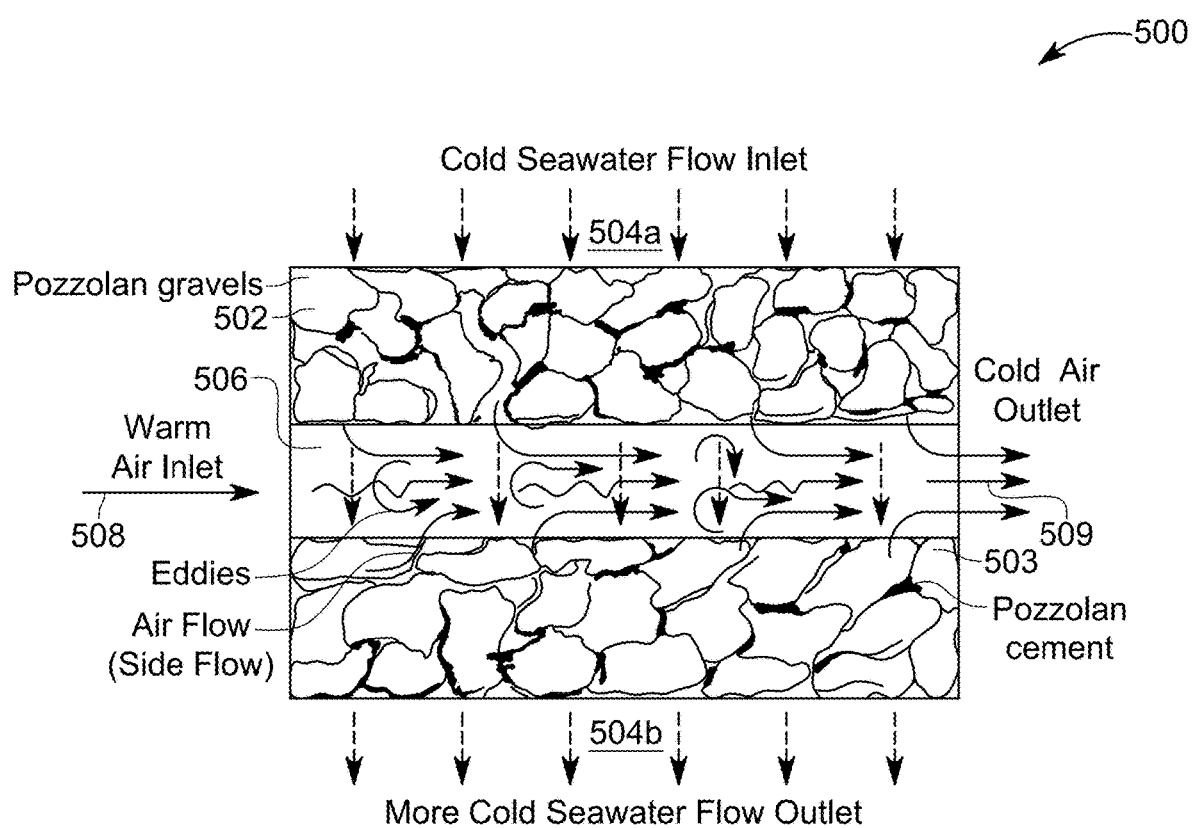
FIGS. 5A-5F depict exemplary aspects of a porous brick for use in constructing a desiccant and/or a cooling system of the present disclosure.

The one or more desiccant systems 109 and the one or more cooling systems 110 (including cooling systems 110a, 110b for example) can each be a structure formed of a plurality porous bricks, tiles or blocks. A non-limiting example of a porous brick for use in forming the structures is depicted in FIG. 5A, which depicts a vertical cross-section of an exemplary brick. In an aspect the brick 500 is made of a sustainable material such as the aforementioned Pozzolan material and includes a porosity providing the function of allowing seawater or desiccant liquid to pass through the brick, and in particular through the pores of the brick, as described in more detail below. The brick, however, need not be made of Pozzolan material but may be made of any material that allows the brick to be porous and allows the brick to provide the function of letting seawater or desiccant liquid to pass through the pores of the brick.

The brick 500 of FIG. 5A will now be described in operation in conjunction with the flow cold seawater through the brick for use in one or more of the cooling systems 110. It should be understood, however, that the same brick may also be used in forming one or more of the desiccant systems 109 whereby desiccant liquid passes through the pores of the bricks instead of cold seawater. As depicted in FIG. 5A, brick 500 is a porous brick composed of a plurality of Pozzolan granuals or particles 503 that may be bound together using Pozzolan cement 504. An air passage 506 is provided having a warm air inlet 508 to receive warm air 108 or 108a and an air outlet 509. Air passage 506 is generally horizontally disposed, however, it need not be and other configurations may be provided. The air passage is configured to allow air passing through the passageway to intersect and mix with liquid passing through the porous material. In an aspect, the air passes through the passageway in a cross-current manner to the flow of the liquid through the porous material.

As depicted in FIG. 5A, in regards to an exemplary cooling system 110, cold seawater 504A is provided from seawater tank 104 to the brick 500. The cold seawater passes through the pores of the brick, in this case by gravity. The seawater exits 504b the brick at its bottom, ultimately to be collected in a basin, for example basin 310. As the cold seawater passes through brick 500, it passes by and through air passage 506 contacting and cooling the warm air 508 as it passes through air passage 506 of the brick exiting at outlet 509. The seawater may pass cross-current through the flow of the warm air 508. It should be understood that the brick 500 of FIG. 5A can also be used in a desiccant system 109 that receives desiccant liquid passing through the brick and warm air 108.

In an embodiment, relatively warm or hot seawater 504A can be provided from seawater tank 104 to the brick 500. The warm or hot seawater can pass through the pores of the brick 500, in this case by gravity. The seawater exits 504b the brick at its bottom, ultimately to be collected in a basin, for example basin 310. As the warm or hot seawater passes through brick 500, it passes by and through air passage 506 contacting and heating and/or humidifying the relatively cooler air 508 as it passes through air passage 506 of the brick exiting at outlet 509. Thus relatively cooler ambient air 508 can be introduced into unit 500 and pass there through. The relatively cooler ambient air can enter the unit 500 at a first temperature, $T_1$, and a first humidity, $H_1$, and can exit the unit 500 at a higher temperature $T_2$, and/or a higher humidity $H_2$.

Figure 5B:
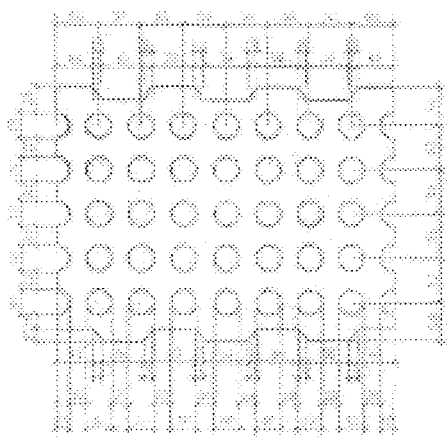
Figure 5C:
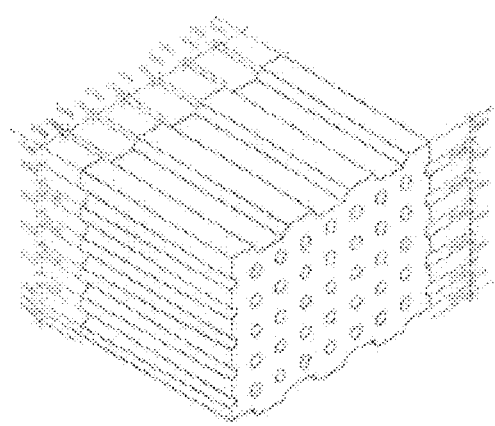
Figure 5D:
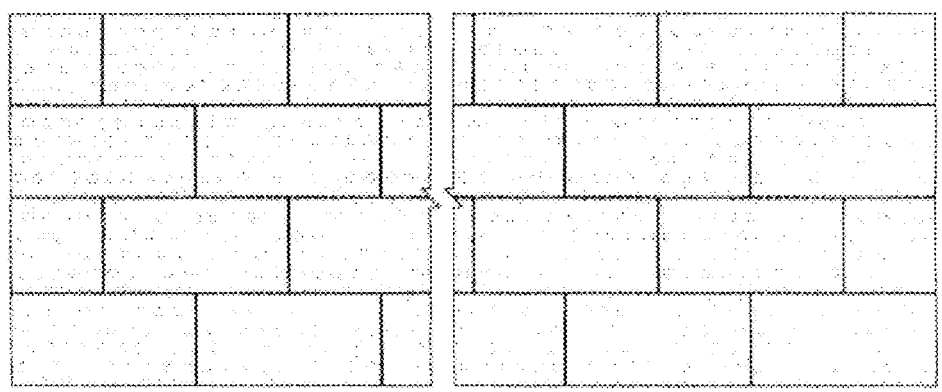

Depicted in FIGS. 5B and 5C are views of an exemplary brick 500 showing that the in one or more aspects the brick may include a plurality of air inlets 508. In one or more aspects a desiccant system 109, as well as a cooling system 110, can be configured with a plurality of bricks 500 and designed in such a way that either desiccant liquid or cold seawater is provided to the structure, passing through the porous bricks and within which warm air 108, 108a is contacted by a desiccant liquid or the cold seawater, respectively, serving to dehumidify and/or cool the warm air as it passes through and exits the systems and is delivered to one or more of the houses of the bio-farm. FIG. 5D depicts an exemplary wall structure comprised of a plurality of such bricks for use in a desiccant system 109 or a cooling system 110 or both.

Figure 5E:
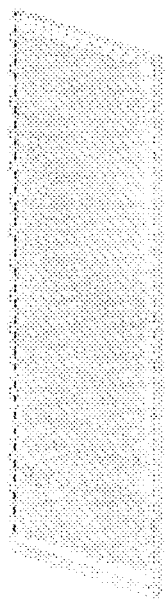

In an embodiment the porous material can be formed as tiles, such as tiles made of Pozzolan. The tiles can have one face that is rough and having a plurality of groves serving as passageways for air to pass through the tiles and mix with a liquid, such as a coolant or desiccant. Different surface shapes can be provided to increase the air and liquid mixing and also create eddies and air turbulence to increase the cooling efficiency. Another face of the tile can be smooth. The Pozzolan tiles can be installed side by side with a shaped and rough side of one tile placed beside the smooth face of another such tile. The top and the bottom of the tiles can be configured to collect the water from the top of the tile(s) and guide it to one or more bottom basins. Depicted in FIG. 5E is one of many possible examples of such a tile, wherein the back side of the tile has a smooth face. While the tile of FIG. 5E depicts the air passageways as cut diagonally across the face of one side of the tile, one skilled in the art would recognize that many other configurations for the air passageways can be employed.

Figure 5F:
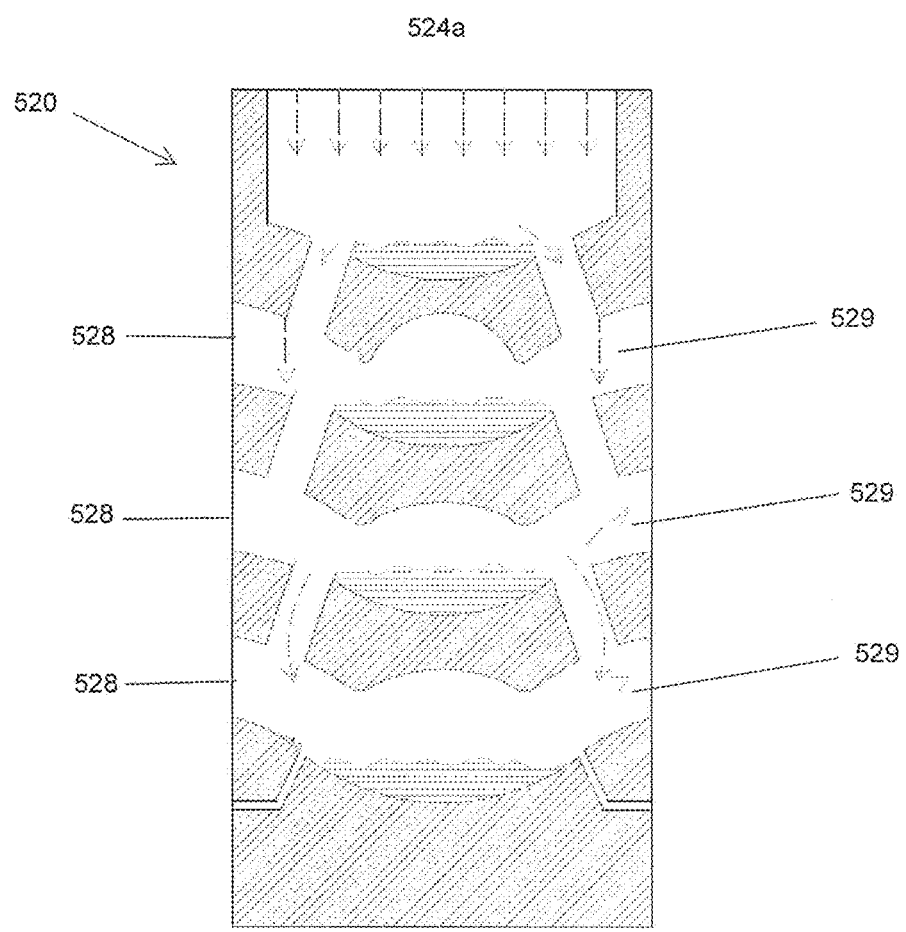

In another embodiment the porous material can be configured to the size and shape of the conventional cellulose pads, allowing existing buildings to be retrofit with Pozzolan bricks blocks, or tiles in place of cellulose pads without requiring any other changes or modification to the existing building. One example of such a brick, block or tile is depicted in FIG. 5F. The liquid 524a enters the brick from the top of the brick and passes out at or near the bottom of the brick. Air passageways are provided with inlets allowing air to enter the brick from one side, passing through the brick and exiting the brick from outlets 529. The air passageways can be configured to have a downward dip between the air inlet and outlet ports creating a basin in which some liquid can collect to aid in mixing of the air and liquid. In an aspect the brick can be about 100 cm wide and about 200 cm tall. It would be recognized by one skilled in the art that other configurations for the air and liquid passageways can be provided to allow for the mixing of the air and the liquid. It will also be recognized that the particular air passageways depicted in FIG. 5F can also be employed in the aforementioned bricks and tiles and that the tiles and pads of FIGS. 5E and 5F can be formed into various wall structures such as that of FIG. 5D.

Figure 6:
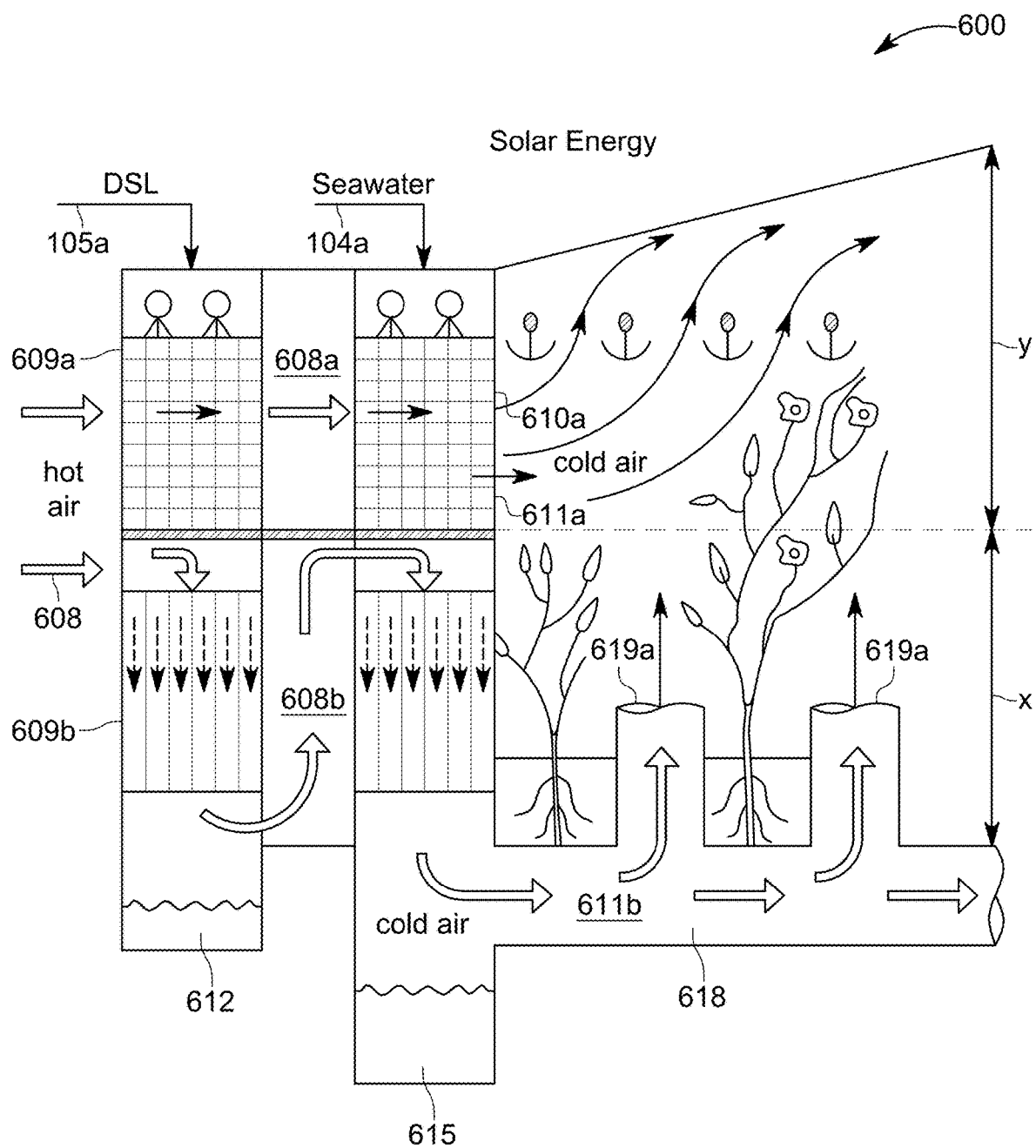
FIG. 6 depicts another example of a desiccant and a cooling system for conditioning air passing through a bio-farm of the present disclosure.

FIG. 6 depicts another non-limiting example of a unit 300 including a desiccant system and a cooling system for receiving hot humid ambient air and conditioning the air to dehumidify it and cool it for introduction into one or more houses of a bio-farm. The desiccant liquid system includes an upper portion 609a configured with a plurality of porous bricks, such as those described above. And a lower portion 609b, also configured with a plurality of porous bricks. The desiccant system receives desiccant liquid from inlet line 105a. In one or more aspects inlet line 105a may lead to one or more pipes or sprayers for delivering the desiccant liquid to the top of the upper portion 609a of the desiccant liquid system. The upper portion 609a and the lower portion 609b of the desiccant system operates similarly to receive desiccant liquid and cause the desiccant liquid to come into contact with hot humid air 608 for drawing humidity out of the hot humid air. The desiccant liquid passes through the upper and lower portions 609a, 609b and is collected in basin 612 ultimately for return desiccant tank 105.

The cooling system includes an upper portion 610a and a lower portion 610b that receives seawater from inlet conduit 104a. The seawater passes through the upper and lower portions of the cooling system, 610a, 610b contacting air 608a, 608b, respectively, received from the desiccant system for cooling the air. The seawater is collected in basin 615, ultimately for return back to seawater tank 104.

As depicted in FIG. 6, the upper portion 610a of the cooling system is associated with the upper portion 609a of the desiccant system and receives dehumidified or desiccant air 608a from the desiccant system cooling the air and delivering the cool air 611a to the interior of one or more of the houses of the bio-farm. The lower portion 610b of the cooling system is associated with the lower portion 609b of the desiccant system for receiving cooled desiccated air 608b from the desiccant system for cooling the air. The cooled air 611b from exiting the lower portion 610b of the cooling system is delivered to a conduit or passageway 618 that is located underground, or underneath one or more of the houses. One or more outlets 619a can be provided allowing the cold air 611b to exit from the underground passageway 618 up into one or more of the houses of the bio-farm. The cool air 611a, 611b entering one or more of the houses in the bio-farm can then be drawn through the bio-farm by, for example, one or more exhaust fans or one or more solar updraft towers as described above.

Comparative Data

Comparative data was collected during May 2015 on two cooling instillations on in Algharbia farm located in Ryadh, Saudi Arabia. The reference instillation is a standard cooling system containing conventional cellulose evaporative cooling pads. The test system is an evaporative cooling and heating system containing pozzolan cooling walls. The design of the pozzolan walls is depicted in FIGS. 7-9. FIG. 7A is an elevation view of the pozzolan wall 700 having a concrete basin 710 depicted in FIG. 7C. The concrete basin 710 has a basin region 711 designed for collecting liquid after it has passed through one or more of the structures. The basin has a fluid outlet 712 for the liquid to be removed from the basin. The wall is made from a plurality of pozzolan bricks 720. Although the cooling wall 700 can be made to a variety of size dimensions, here the pozzolan bricks 720 are stacked to a height of about 200 cm. The width of the basin is 100 cm. The pozzolan bricks form an outer wall surface 721 and an inner wall surface 722. The wall has a distribution chamber 730 near the top of the pozzolan wall 700 covered on the top by a cover tile 732 depicted in FIG. 7B. The wall 700 can have a fluid inlet 734 for liquid, for example seawater, to be delivered to the top of the pozzolan brick structure. The wall structure 700 can also have a second fluid inlet 735 for delivering a liquid desiccant or humidifying liquid to the distribution chamber 730. The wall structure of FIG. 7D is an embodiment of an evaporative cooling system wherein seawater is delivered via inlet 734 to one end (the tops) of the pozzolan brick structures 720 and allowed to flow down through the structures 720 and out the opposite end of the structures into the basin 710. The wall structure of FIG. 7E is an embodiment of an evaporative cooling system and humidification system further including inlet 735 for delivering liquid desiccant to the distribution chamber 730.

Figure 8A:
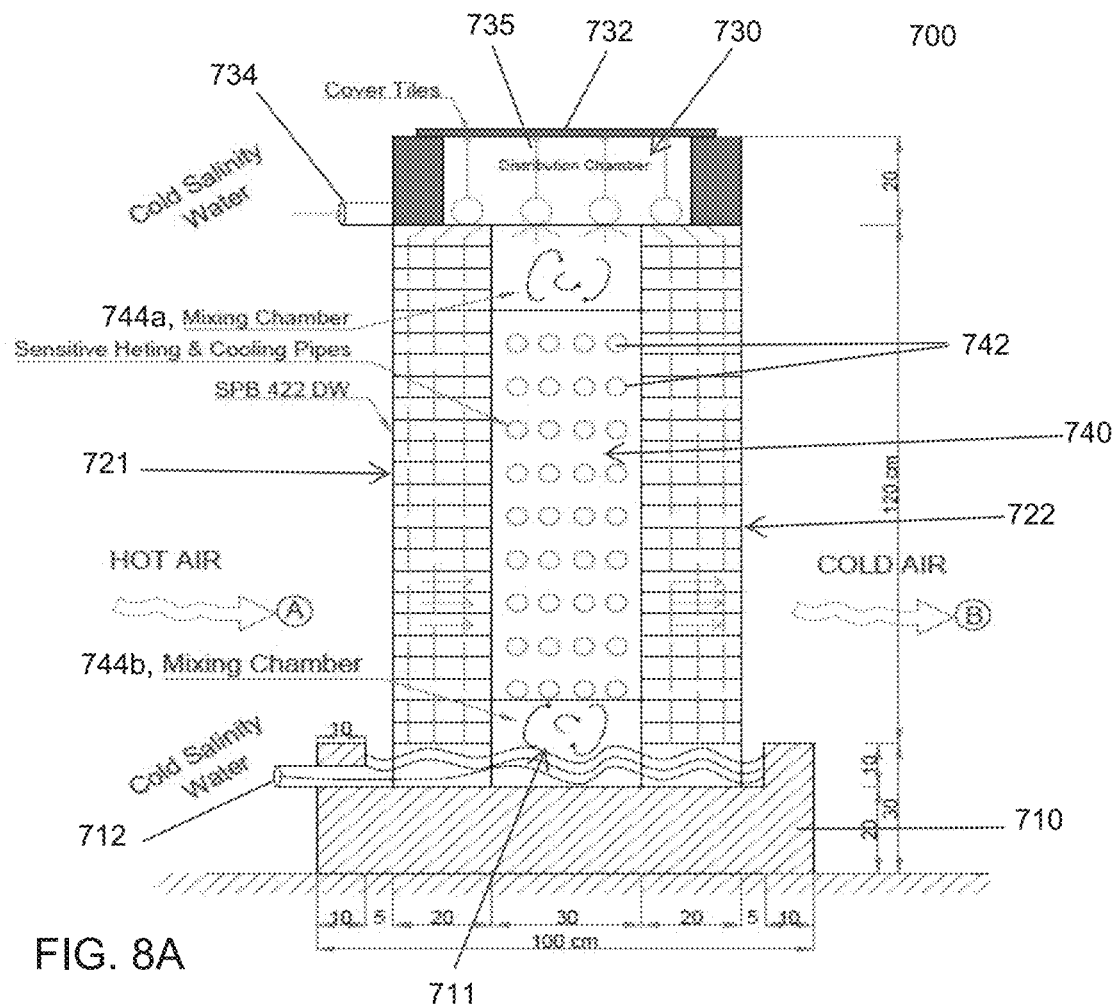
FIG. 8A is a section view of the pozzolan cooling wall.

FIG. 8A is view of another embodiment of a wall structure 700. The wall structure of FIG. 8A is similar to the wall structure of FIG. 7E further including, however, an interior region 740 having a plurality of heating and cooling pipes 742 running laterally along the long dimension of the wall and one or more mixing chambers 744a, b. The pipes 742 can be used to control the temperature within a structure, such as the greenhouse, providing for example cooling and humidification in the summer and heating in the winter.

Figure 8B:
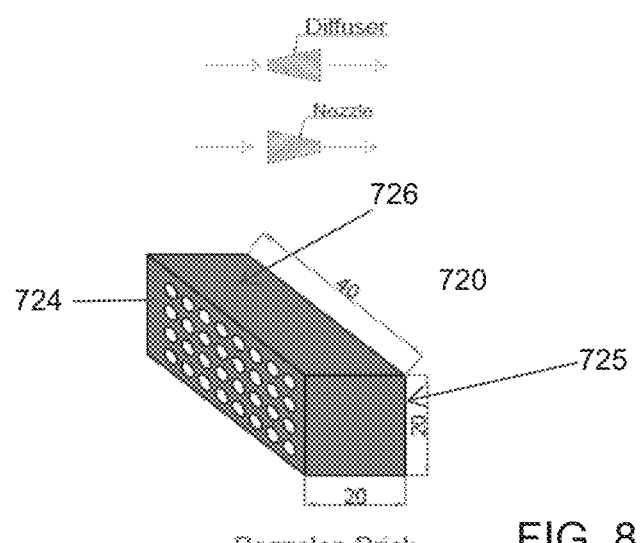
FIG. 8B is a perspective view of the pozzolan brick.

FIGS. 8B and 9A are perspective views of a pozzolan brick 720 having a plurality of air passages 723 extending laterally from a first surface of the brick 724 to a second surface of the brick 725. FIGS. 9B and 9C are surface views of the first surface of the brick 724 and the second surface of the brick 725. The air passages 723 can be tapered such that the air passage at one end 728 near the first surface of the brick 724 is larger in diameter than the diameter of the air passage at its opposite end 729 near the second surface of the brick 725. The tapering of air passage 723 is designed to promote turbulence in the air as it passes through air passage 723 thus increasing the efficiency of the mixing, and thus the heat transfer, between the fluid and the air to improve the efficiency of cooling or heating of the air. The tapering of the air passages 723 is depicted in the sectional view of FIG. 9D. FIGS. 9E and 9F are surface views of the long surface 726 and the short surface 727 of the pozzolan brick 720.

In an embodiment, the fluid or liquid is introduced into the distribution chamber 730 through the fluid inlet 734. The cold fluid can be a desiccant liquid or, as in this case, can be salt water. The cold fluid passes through the pores of the pozzolan brick 720, in this case by gravity. The cold fluid exits, ultimately to be collected in the basin region 711 of the concrete basin 710. Hot and/or humid air impacting the outer wall surface 721 passes through air passages 723 in the pozzolan bricks 720 and is contacted by the cold liquid. The air passes through the interior region 740 and across the plurality of heating and cooling pipes 742 running laterally along the long dimension of the wall. The air then passes through air passages 723 in the next pozzolan blocks 720 where the air is contacted by the cold liquid. The air then exits through the inner wall surface 722 and into the structure to be cooled.

Figure 8C:
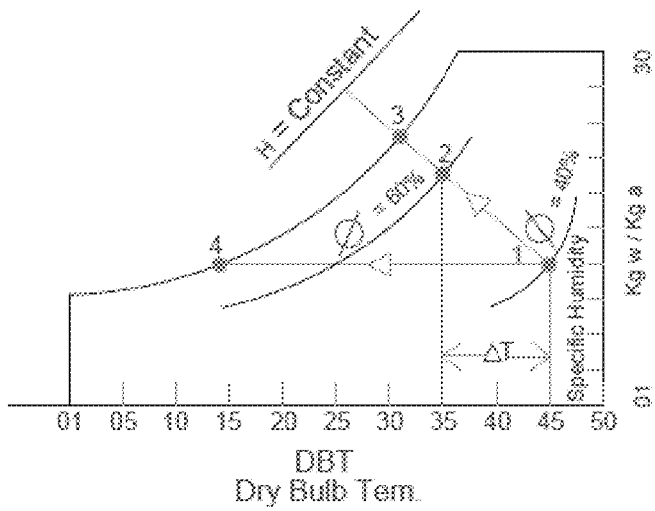
FIG. 8C is a graph of the specific humidity versus temperature depicting a hypothetical evaporative cooling process.
Figure 8D:
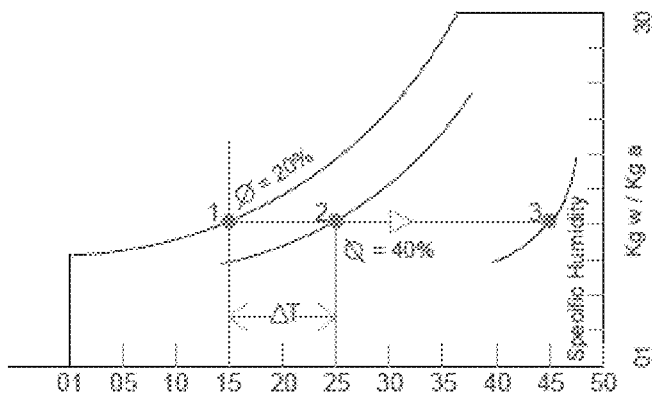
FIG. 8D is a graph of the specific humidity versus temperature depicting a hypothetical solar water air heating process.

FIG. 8C presents calculations plotting dry bulb temperature versus specific humidity for an evaporative cooling process during the summer season using the structure of FIG. 8A. FIG. 8D provides similar calculations for a solar water/air heating process during the winter season.

Figure 10:
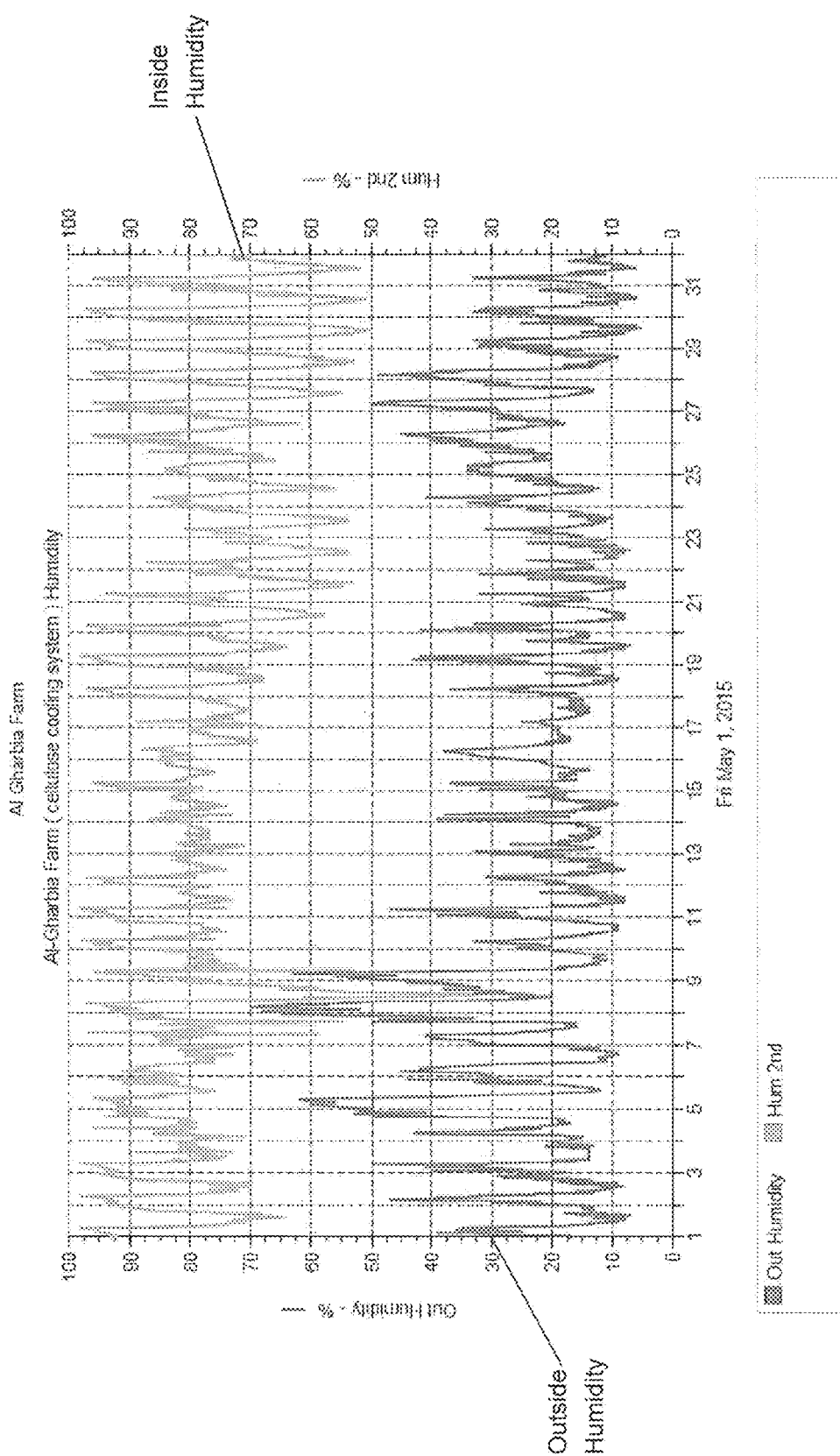
FIG. 10 is a graph of the relative humidity inside and outside using a cellulose pad cooling system during the month of May, 2015 on Al-Gharbia Farm located in Ryadh, Saudi Arabia.
Figure 11:
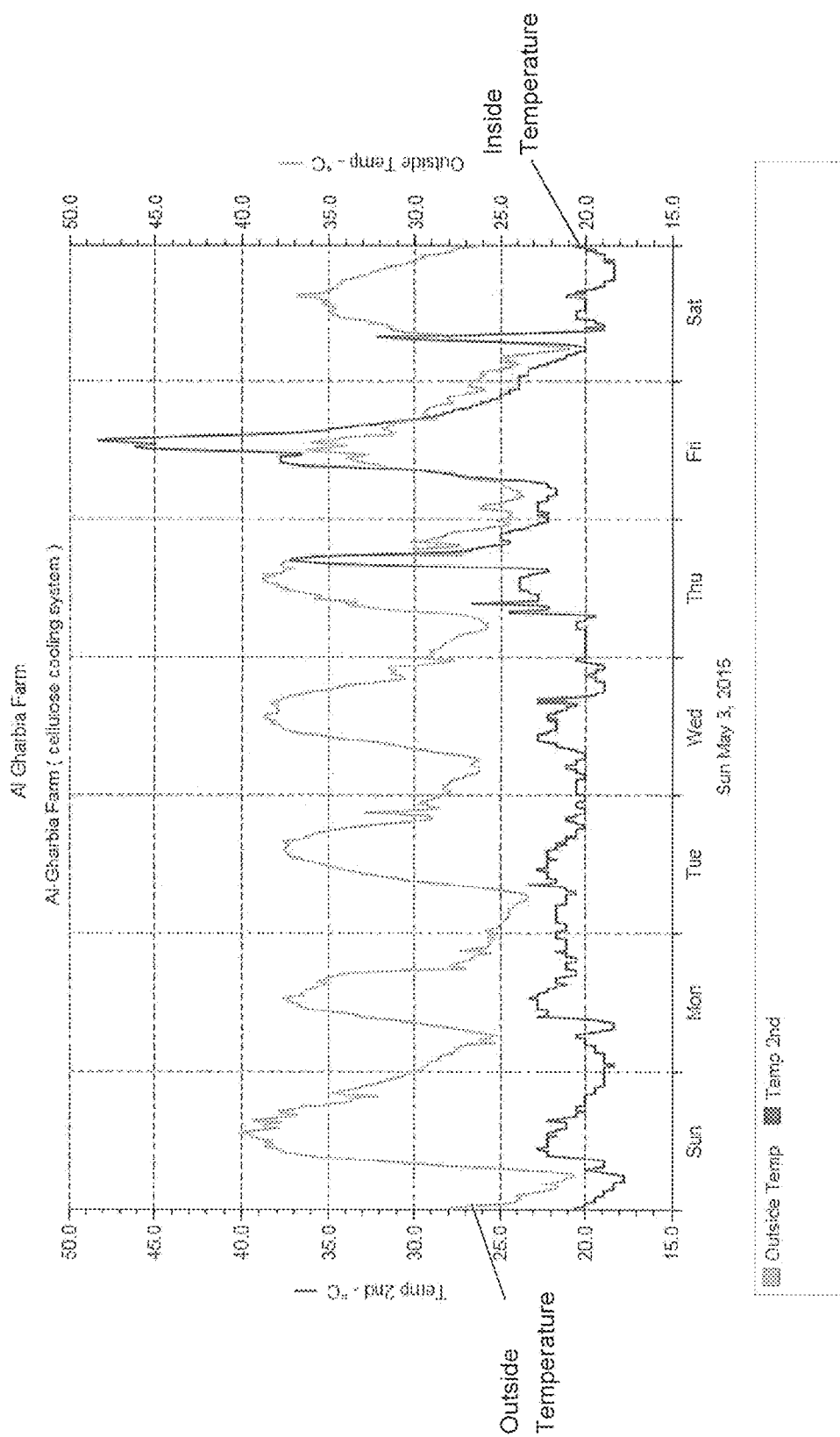
FIG. 11 is a graph of the outside temperature and the inside temperature using a cellulose cooling system during the week of May 3, 2015 on Al-Gharbia Farm located in Ryadh, Saudi Arabia.
Figure 12:
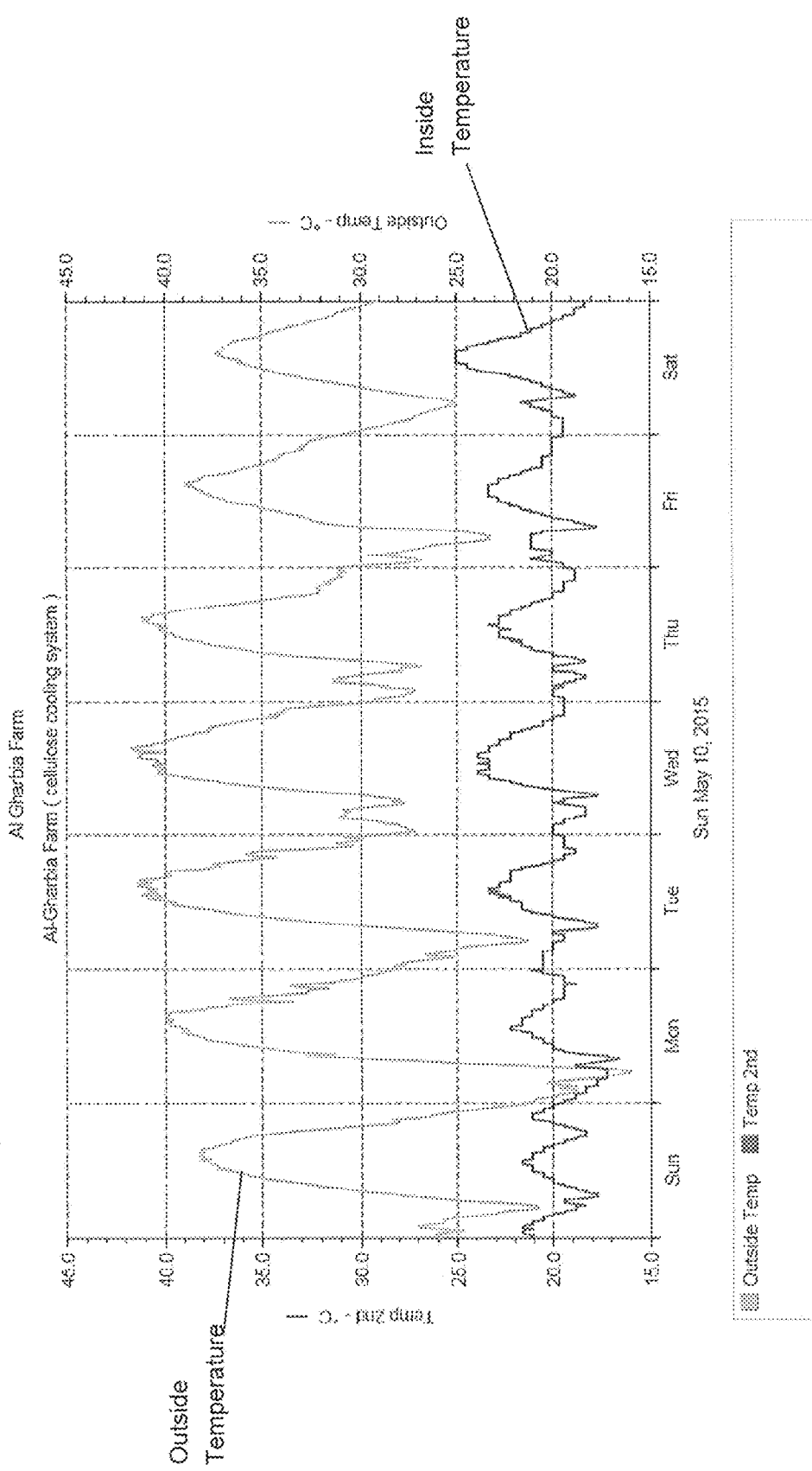
FIG. 12 is a graph of the outside temperature and the inside temperature using a cellulose cooling system during the week of May 10, 2015 on Al-Gharbia Farm located in Ryadh, Saudi Arabia.
Figure 13:
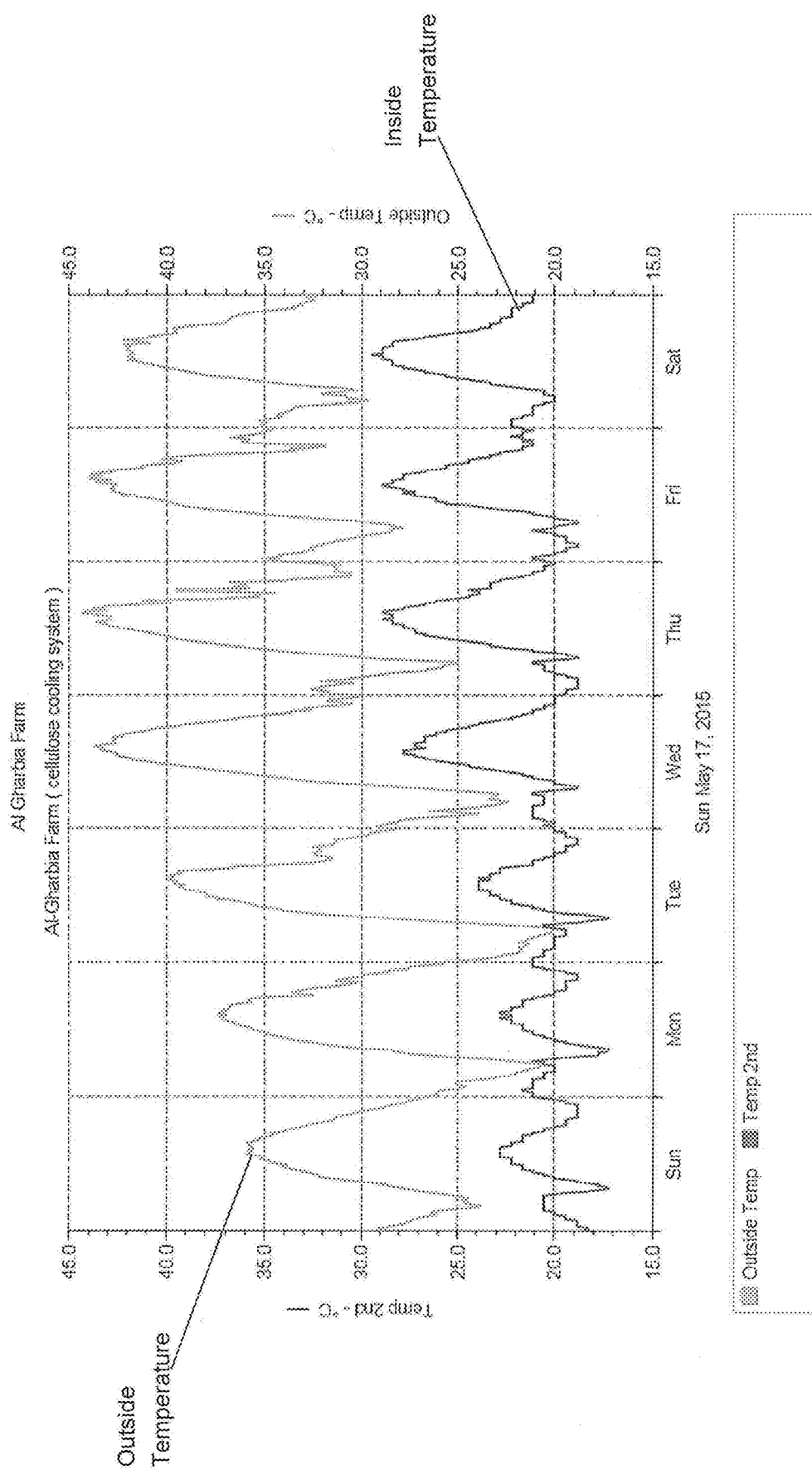
FIG. 13 is a graph of the outside temperature and the inside temperature using a cellulose cooling system during the week of May 17, 2015 on Al-Gharbia Farm located in Ryadh, Saudi Arabia.
Figure 14:
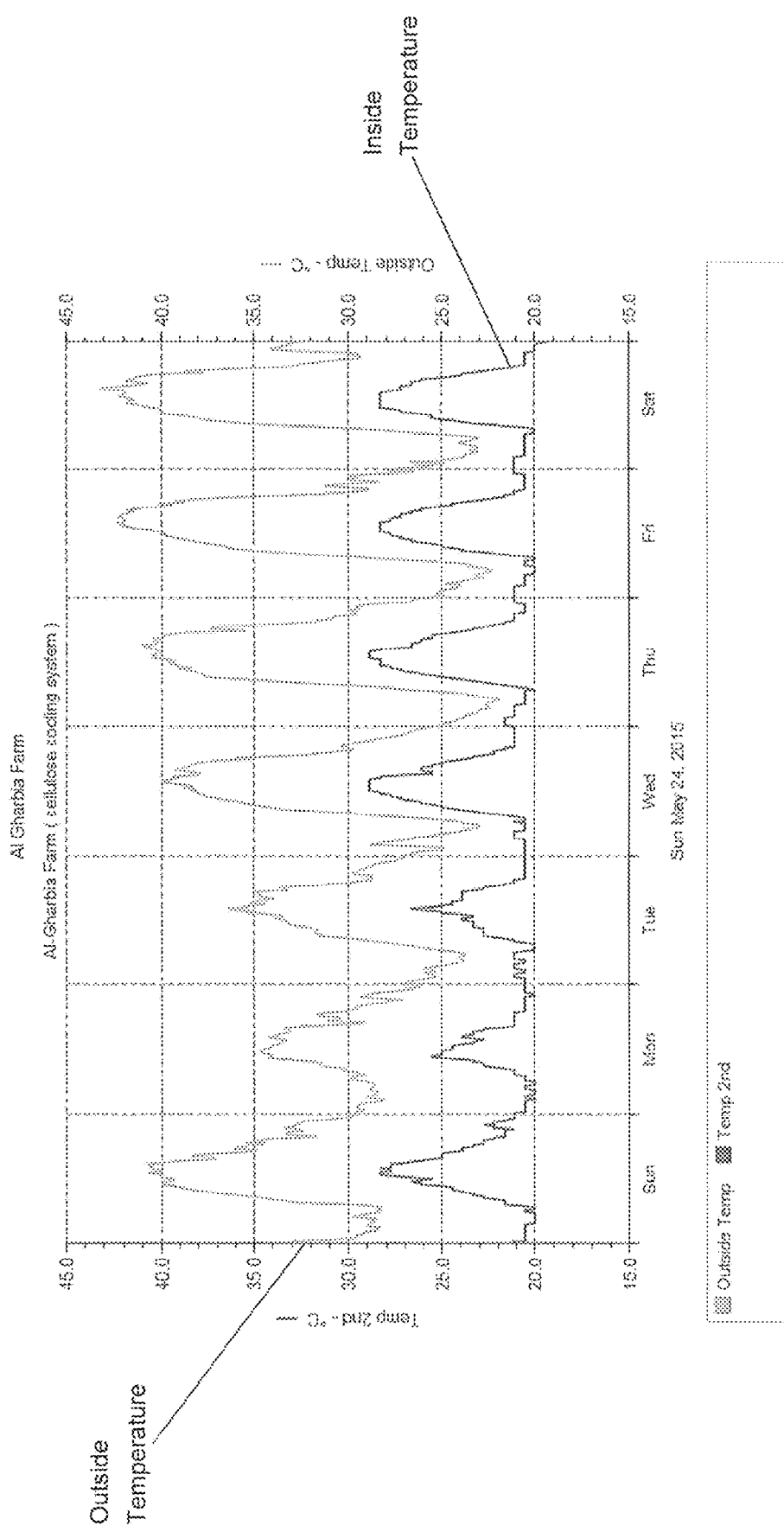
FIG. 14 is a graph of the outside temperature and the inside temperature using a cellulose cooling system during the week of May 24, 2015 on Al-Gharbia Farm located in Ryadh, Saudi Arabia.
Figure 15:
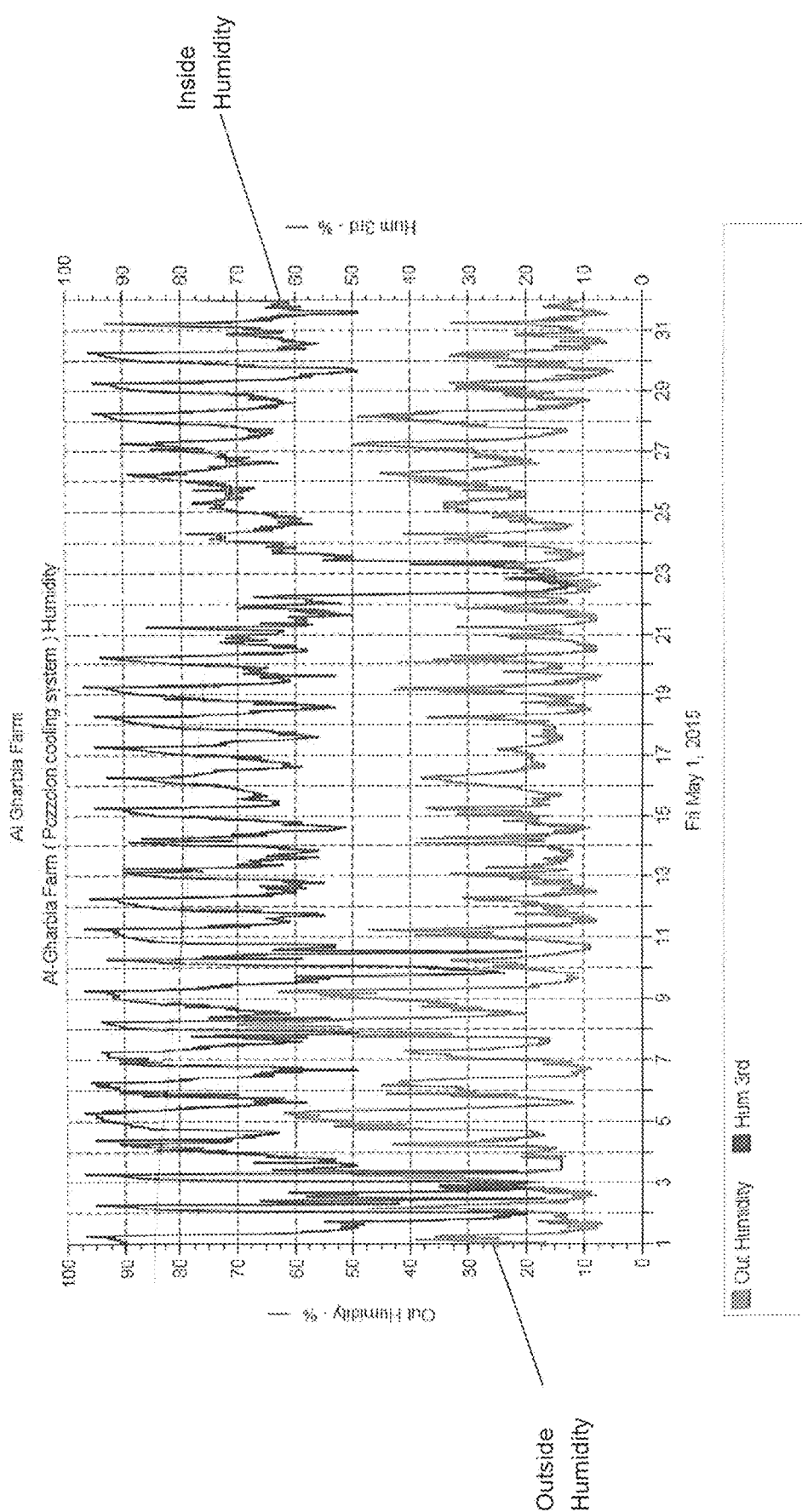
FIG. 15 is a graph of the relative humidity inside and outside using a cellulose pad cooling system during the month of May, 2015 on Al-Gharbia Farm located in Ryadh, Saudi Arabia.
Figure 16:
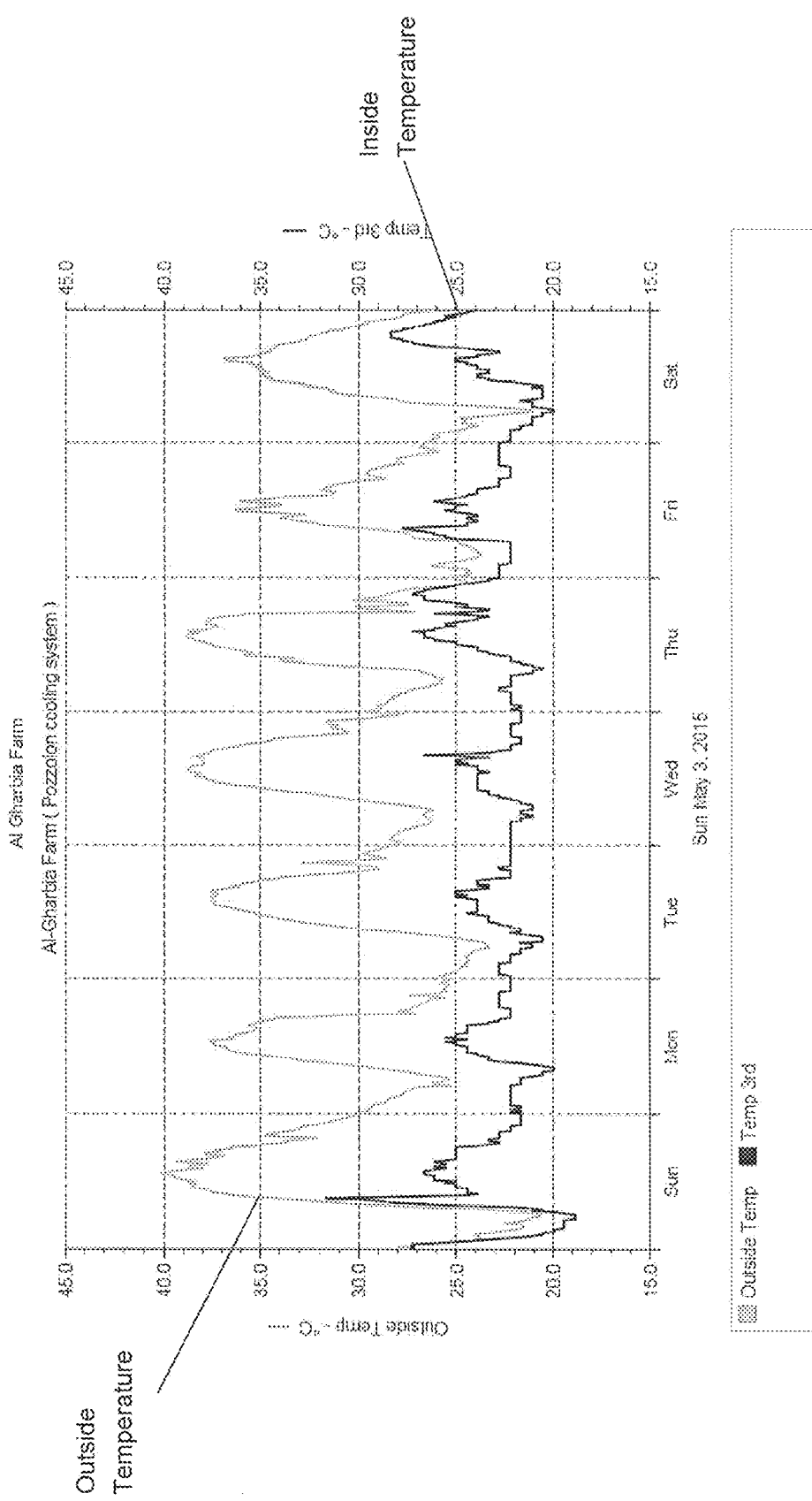
FIG. 16 is a graph of the outside temperature and the inside temperature using the pozzolan cooling system during the week of May 3, 2015 on Al-Gharbia Farm located in Ryadh, Saudi Arabia.
Figure 17:
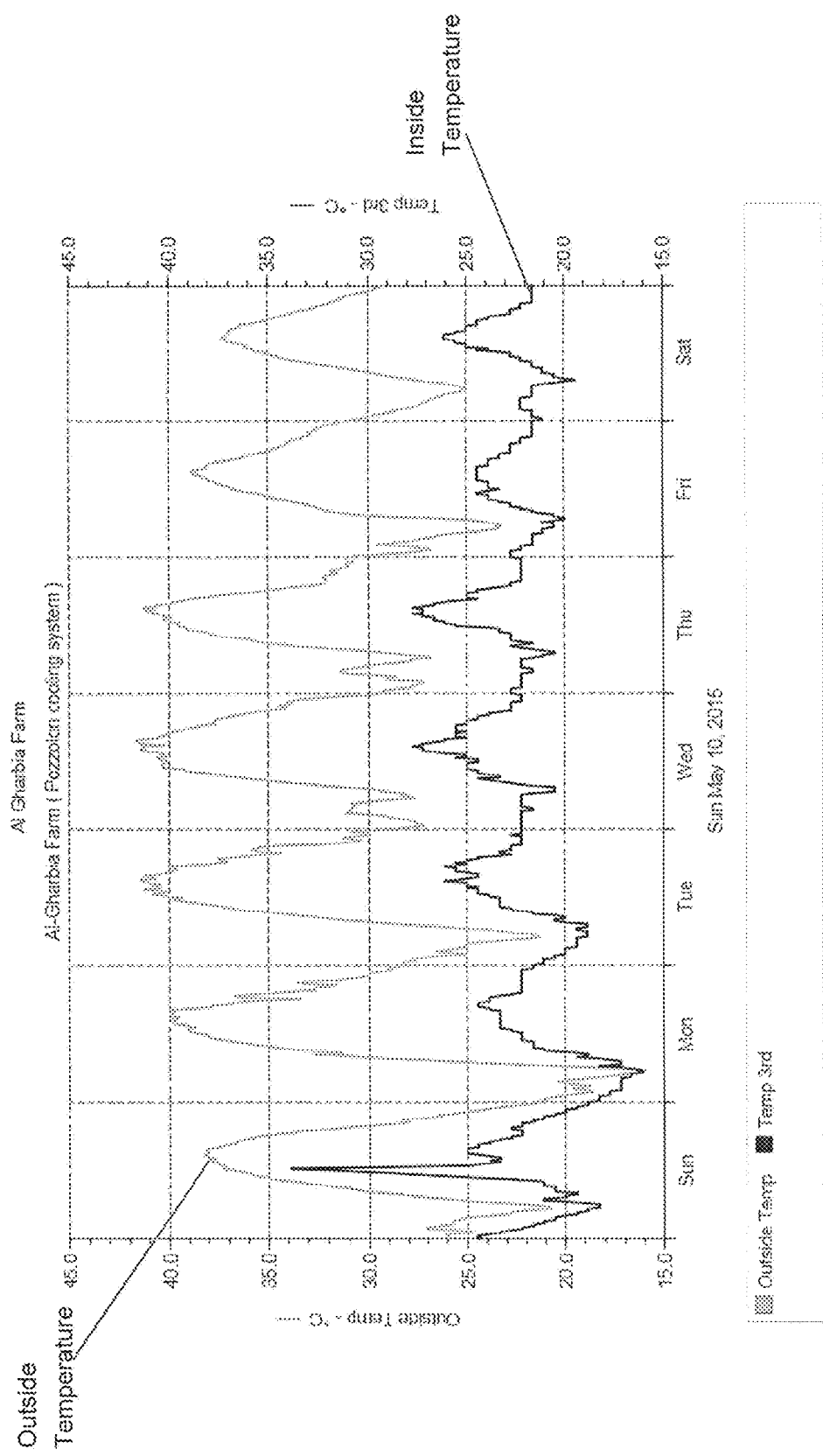
FIG. 17 is a graph of the outside temperature and the inside temperature using the pozzolan cooling system during the week of May 10, 2015 on Al-Gharbia Farm located in Ryadh, Saudi Arabia.
Figure 18:
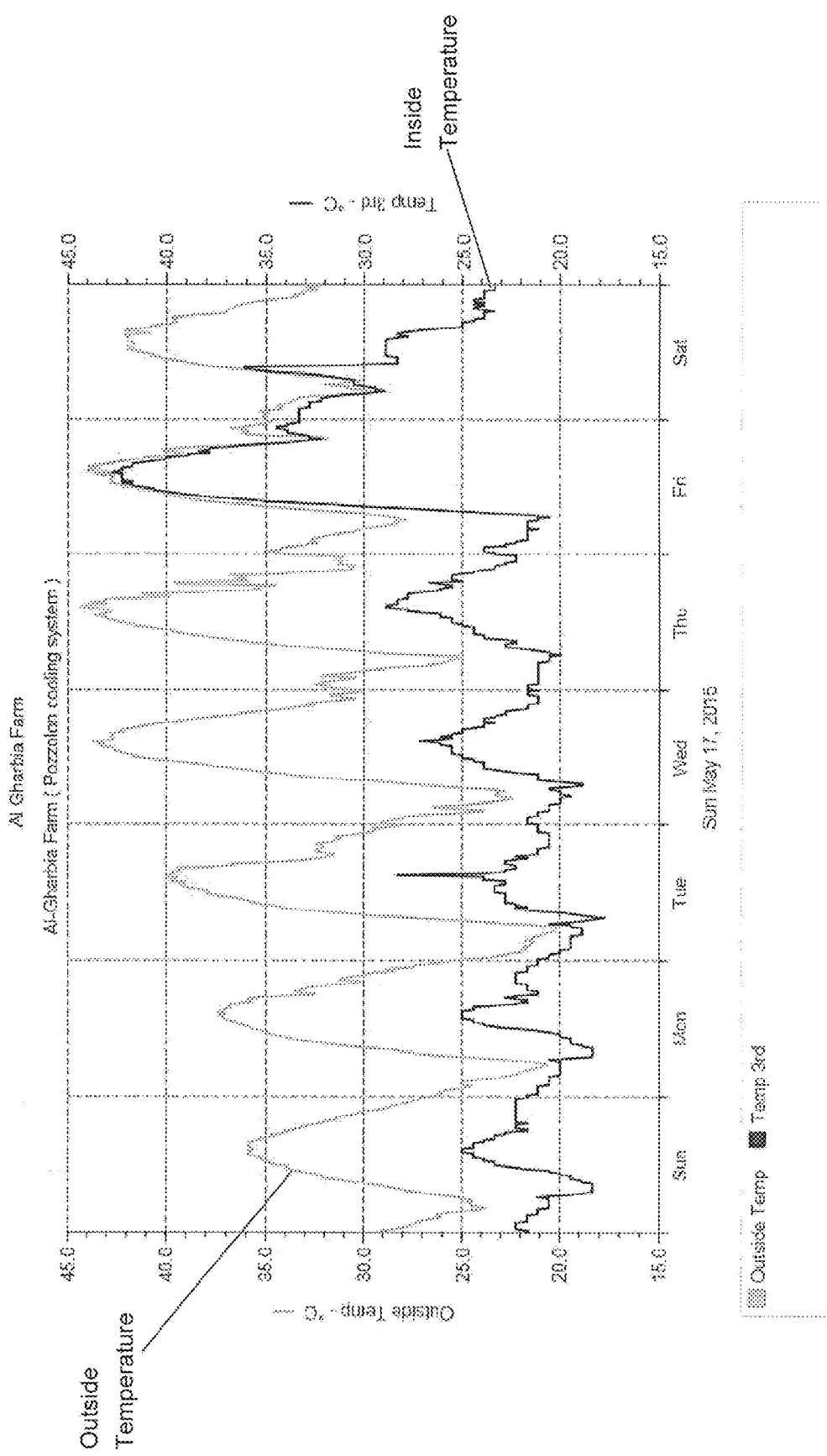
FIG. 18 is a graph of the outside temperature and the inside temperature using the pozzolan cooling system during the week of May 17, 2015 on Al-Gharbia Farm located in Ryadh, Saudi Arabia.
Figure 19:
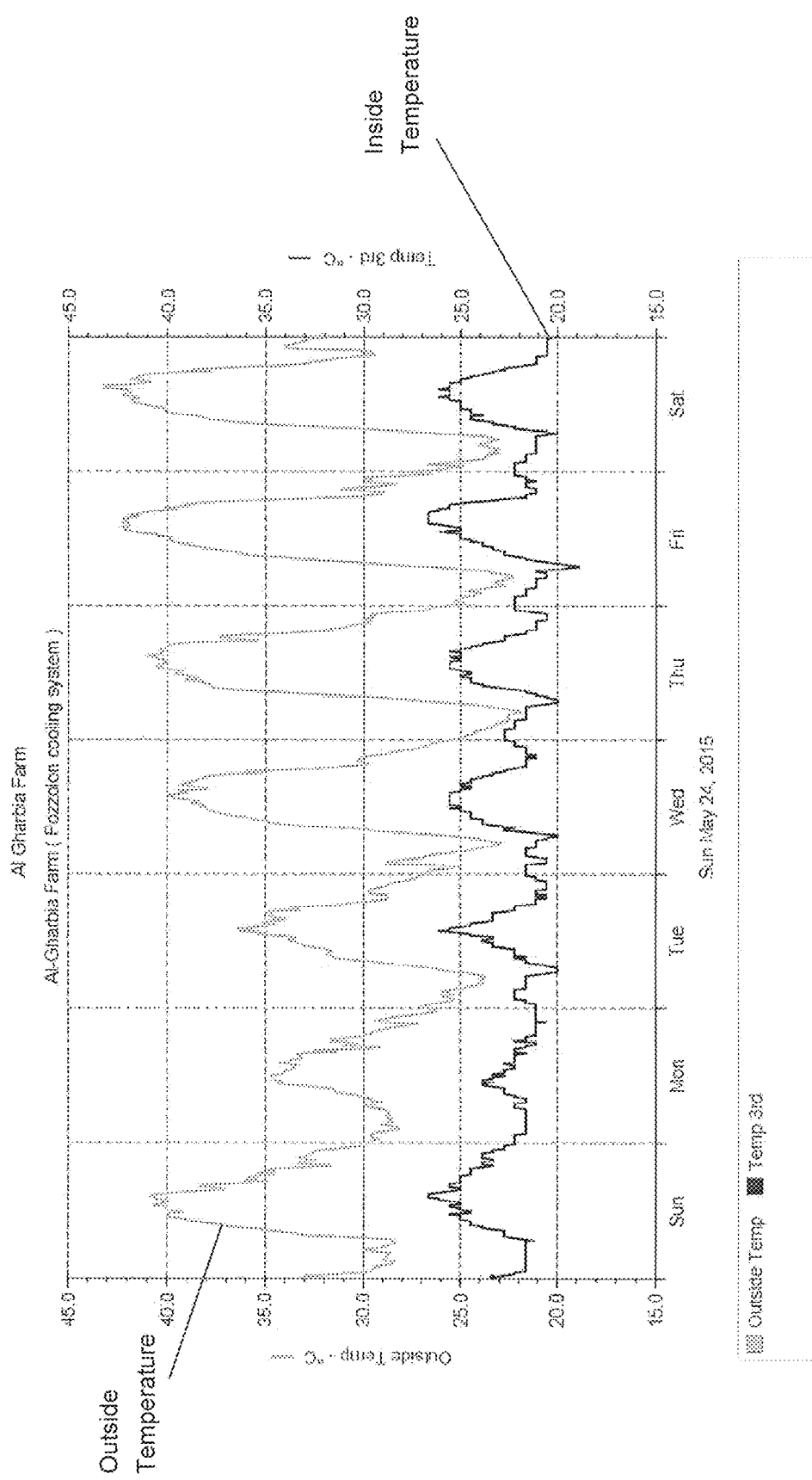
FIG. 19 is a graph of the outside temperature and the inside temperature using the pozzolan cooling system during the week of May 24, 2015 on Al-Gharbia Farm located in Ryadh, Saudi Arabia.

FIG. 10 is a graph of the outside humidity and inside humidity for a comparative cellulose cooling system for the month of May, 2015. FIG. 15 is a graph of the outside humidity and inside humidity for the pozzolan cooling system for the month of May, 2015. FIGS. 11-14 are graphs of the outside temperature and inside temperature for a comparative cellulose cooling system for the month of May, 2015. FIGS. 16-19 are graphs of the outside temperature and inside temperature for the pozzolan cooling system for the month of May, 2015. The results show our pozzolan-based system is comparable to that of the conventional cellulose pad-based system and at some times provided better cooling (as in the case the week of May 24, 2015).

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A system for conditioning air comprisinq:
a structure formed of a porous pozzolan material, the material being sufficiently porous to allow salt water to pass through the material,
the structure including one or more passageways configured to allow air to pass through the one or more passageways through the structure,
the structure configured to cause the salt water passing through a porous portion of the material to intersect and mix with air passing through the one or more passageways,
wherein the material includes pozzolan particles bound together with pozzolan cement, and
wherein the structure is solid and the one or more passageways extends horizontally from one end of the solid structure to another end of the solid structure.

2. The system of claim 1, wherein the structure is formed as a brick, tile or block.

3. The system of claim 1, wherein the structure includes a plurality of air passageways and the air passageways are configured to induce turbulence in air passing through the passageways.

4. The system of claim 1, comprising a plurality of the structures, the system further having means to supply the salt water to the plurality of the structures and one or more basins for collecting the salt water after it has passed through the plurality of the structures.

5. The system of claim 4, wherein the means to supply the salt water provides cooling salt water to the system and the mixing of the air and the salt water in the system creates an evaporative cooling mechanism of air passing through one or more of the passageways.

6. The system of claim 5, wherein the conditioning of the air is selected from the group of de-humidifying, humidifying, cooling or heating the air.

7. The system of claim 4, wherein the system includes:
a first structure formed of a porous siliceous or siliceous and aluminous material, the material being sufficiently porous to allow a liquid to pass through the material, the first structure including one or more passageways configured to allow air to pass through the one or more passageways through the structure, the first structure configured to cause the liquid passing through a porous portion of the material to intersect and mix with air passing through the one or more passageways the one or more passageways of the first structure having an inlet configured to receive air into the one or more passageways and an outlet configured to allow air to pass out of the one or more passageways of the first structure; and means to supply a liquid desiccant to the material in the first structure; and
a second structure formed of a porous siliceous or siliceous and aluminous material, the material being sufficiently porous to allow another liquid to pass through the material, the second structure including one or more passageways configured to allow air to pass through the one or more passageways through the second structure, the second structure configured to cause the another liquid passing through a porous portion of the material to intersect and mix with air passing through the one or more passageways the one or more passageways of the second structure having an inlet configured to receive air from the outlet of the one or more passageways and an outlet configured to allow air to pass out of the one or more passageways of the second structure and means to supply a cooling water to the material in the second structure.

8. The system of claim 7, wherein the liquid is a liquid desiccant in the form of a mixed salt desiccant liquid.

9. The system of claim 8, wherein the liquid dessicant is selected system from the group consisting of calcium chloride, magnesium chloride, lithium chloride or lithium bromide.

10. The system of claim 7, wherein the another liquid is salt water.

11. The system of claim 7, wherein the cooling water is sea water.

12. A method for conditioning air, comprising:
a) providing a system of claim 1, the one or more passageways each including an inlet and an outlet;
b) providing a supply of the salt water to the porous material and causing the salt water to flow through the porous material;
c) providing air to the inlet of the one or more passageways and causing the air to flow through the one or more passageways; and
d) causing the flow of the air to intersect with and mix with the flow of the salt water, the mixing of the air with the salt water resulting in a conditioning of the air.

13. The method of claim 12, wherein the conditioning of the air is selected from the group of de-humidifying, humidifying, cooling or heating the air.

14. The method of claim 12, wherein the system includes:
a first structure formed of a porous siliceous or siliceous and aluminous material, the material being sufficiently porous to allow a liquid to pass through the material, the first structure including one or more passageways configured to allow air to pass through the one or more passageways through the structure, the first structure configured to cause the liquid passing through a porous portion of the material to intersect and mix with air passing through the one or more passageways the one or more passageways of the first structure having an inlet configured to receive air into the one or more passageways and an outlet configured to allow air to pass out of the one or more passageways of the first structure; and means to supply a liquid desiccant to the material in the first structure; and
a second structure formed of a porous siliceous or siliceous and aluminous material, the material being sufficiently porous to allow another liquid to pass through the material, the second structure including one or more passageways configured to allow air to pass through the one or more passageways through the second structure, the second structure configured to cause the another liquid passing through a porous portion of the material to intersect and mix with air passing through the one or more passageways the one or more passageways of the second structure having an inlet configured to receive air from the outlet of the one or more passageways and an outlet configured to allow air to pass out of the one or more passageways of the second structure and means to supply a cooling water to the material in the second structure.

15. The method of claim 14, wherein the liquid is a liquid desiccant in the form of a mixed salt desiccant liquid.

16. The method of claim 15, wherein the liquid desiccant is selected system from the group consisting of calcium chloride, magnesium chloride, lithium chloride or lithium bromide.

17. The method of claim 14, wherein the another liquid is salt water.

18. The method of claim 14, wherein the another liquid is seawater.

* * * * *